(12) United States Patent
Kapustin et al.

(10) Patent No.: US 12,098,530 B1
(45) Date of Patent: Sep. 24, 2024

(54) WATER HARVESTER ADSORPTION ENTHALPY REMOVAL SYSTEM

(71) Applicant: Water Harvesting, Inc., Fremont, CA (US)

(72) Inventors: Ievgen Kapustin, Fremont, CA (US); David S. Kuo, Fremont, CA (US); Kent D. Penning, Fremont, CA (US)

(73) Assignee: Water Harvesting, Inc., Fremont, CA (US)

( * ) Notice: Subject to any disclaimer, the term of this patent is extended or adjusted under 35 U.S.C. 154(b) by 0 days.

(21) Appl. No.: 18/384,992

(22) Filed: Oct. 30, 2023

Related U.S. Application Data

(63) Continuation of application No. 18/380,111, filed on Oct. 13, 2023.

(51) Int. Cl.
  *F25B 15/00* (2006.01)
  *B01D 53/26* (2006.01)
  *E03B 3/28* (2006.01)

(52) U.S. Cl.
  CPC .............. *E03B 3/28* (2013.01); *B01D 53/261* (2013.01)

(58) Field of Classification Search
  CPC ...................... F25B 15/00; F25B 15/06; F25B 2400/0401; F25B 2400/0411; F25B 25/005; F25B 2500/01; F25B 2600/13; F25B 2600/2501; F25B 27/02; F25B 39/02; F25B 39/026; F25B 40/02; F25B 41/20; F25B 6/04; F25B 7/00
  See application file for complete search history.

(56) References Cited

U.S. PATENT DOCUMENTS

| | | | |
|---|---|---|---|
| 1,559,762 A | 11/1925 | Newman | |
| 4,180,985 A | 1/1980 | Northrup, Jr. | |
| 4,304,577 A | 12/1981 | Ito et al. | |
| 4,646,541 A * | 3/1987 | Reid, Jr. ............... | F25B 47/003 62/476 |

(Continued)

FOREIGN PATENT DOCUMENTS

| | | |
|---|---|---|
| CA | 3120865 | 7/2023 |
| CN | 102639540 A | 8/2012 |

(Continued)

OTHER PUBLICATIONS

Canivet et al. Water adsorption in MOFs: fundamentals and applications. Chem. Soc. Rev., Aug. 2014, 43(16):5594-5617.

(Continued)

*Primary Examiner* — Filip Zec
(74) *Attorney, Agent, or Firm* — Craig R. Miles; CR MILES P.C.

(57) ABSTRACT

Generally, a water harvester useful in harvesting water from supply air. Specifically, a water harvester configured to remove the heat gained during adsorption of water by the water capture material contained in the water capture modules of the water harvester. Removal of the enthalpy associated with the adsorption of water by the water capture material can lower the equilibrium temperature of the water capture material and increase the driving potential of adsorption by the water capture material and correspondingly increase the difference in absolute humidity between the supply air passing into a water capture module and the discharge air passing out of a water capture module.

9 Claims, 11 Drawing Sheets

(56) References Cited

U.S. PATENT DOCUMENTS

| | | | |
|---|---|---|---|
| 5,565,139 A | 10/1996 | Walker et al. | |
| 5,632,802 A | 5/1997 | Grgich et al. | |
| 5,632,954 A | 5/1997 | Coellner et al. | |
| 6,334,316 B1* | 1/2002 | Maeda | F24F 5/001 62/271 |
| 6,684,648 B2 | 2/2004 | Faqih | |
| 8,500,886 B2* | 8/2013 | Okano | B01D 53/06 96/123 |
| 8,627,673 B2 | 1/2014 | Hill et al. | |
| 8,764,882 B2* | 7/2014 | Kametani | B01D 53/06 96/132 |
| 9,134,038 B2* | 9/2015 | Lee | F24F 3/1423 |
| 9,446,969 B1 | 9/2016 | Redman et al. | |
| 10,168,057 B2* | 1/2019 | Goldsworthy | B01D 53/261 |
| 10,266,737 B2 | 4/2019 | Van Horn et al. | |
| 10,426,145 B2* | 10/2019 | Zhang | F04D 29/406 |
| 10,695,741 B2 | 6/2020 | Motkuri et al. | |
| 10,829,913 B1* | 11/2020 | Ahmed | B01D 61/025 |
| 10,857,855 B2* | 12/2020 | Tomita | F25B 15/06 |
| 10,948,202 B2* | 3/2021 | Lee | F24F 3/153 |
| 11,008,737 B1* | 5/2021 | Pinto | B01D 53/265 |
| 11,029,045 B2 | 6/2021 | Woods et al. | |
| 11,065,573 B2* | 7/2021 | Matuška | B01D 53/06 |
| 11,565,236 B2* | 1/2023 | Mulet | B01J 20/28011 |
| 11,679,339 B2 | 6/2023 | Van de Mortel | |
| 2004/0107832 A1 | 6/2004 | Tongue et al. | |
| 2004/0123615 A1 | 7/2004 | Yabu | |
| 2004/0123616 A1 | 7/2004 | Lee et al. | |
| 2004/0244398 A1 | 12/2004 | Radermacher et al. | |
| 2005/0044862 A1 | 3/2005 | Vetrovec et al. | |
| 2006/0130652 A1 | 6/2006 | Takewaki et al. | |
| 2007/0028769 A1 | 2/2007 | Eplee et al. | |
| 2009/0139254 A1* | 6/2009 | Landry | B01D 5/0039 62/271 |
| 2009/0151368 A1 | 6/2009 | Bar | |
| 2009/0260385 A1 | 10/2009 | Hill et al. | |
| 2010/0126344 A1* | 5/2010 | Stein | B01J 20/28054 95/95 |
| 2011/0056220 A1 | 3/2011 | Caggiano | |
| 2011/0088552 A1 | 4/2011 | Ike et al. | |
| 2011/0296858 A1* | 12/2011 | Caggiano | B01D 53/28 219/679 |
| 2012/0172612 A1 | 7/2012 | Yaghi et al. | |
| 2013/0036913 A1* | 2/2013 | Fukudome | F24F 12/006 96/118 |
| 2013/0061752 A1 | 3/2013 | Farha et al. | |
| 2013/0192281 A1 | 8/2013 | Nam et al. | |
| 2013/0269522 A1 | 10/2013 | DeValve | |
| 2013/0312451 A1 | 11/2013 | Max | |
| 2014/0138236 A1* | 5/2014 | White | B01D 5/0006 202/185.1 |
| 2014/0165637 A1* | 6/2014 | Ma | F24F 5/0021 62/271 |
| 2014/0287150 A1 | 9/2014 | Miljkovic et al. | |
| 2014/0326133 A1 | 11/2014 | Wang et al. | |
| 2014/0338425 A1 | 11/2014 | Kalbassi et al. | |
| 2016/0030858 A1 | 2/2016 | Giacomini | |
| 2016/0084541 A1* | 3/2016 | Aguado | F25B 17/083 62/238.3 |
| 2016/0334145 A1* | 11/2016 | Pahwa | F25B 17/08 |
| 2017/0008915 A1 | 1/2017 | Yaghi et al. | |
| 2017/0113184 A1 | 4/2017 | Eisenberger | |
| 2017/0129307 A1 | 5/2017 | Zhou et al. | |
| 2017/0211851 A1* | 7/2017 | Feng | F25B 40/02 |
| 2017/0234576 A1* | 8/2017 | Kawagoe | F24H 9/2007 62/203 |
| 2017/0292737 A1 | 10/2017 | Moon | |
| 2017/0354920 A1 | 12/2017 | Switzer et al. | |
| 2018/0043295 A1 | 2/2018 | Friesen et al. | |
| 2018/0171604 A1* | 6/2018 | Kim | B01J 20/3204 |
| 2018/0209123 A1 | 6/2018 | Bahrami et al. | |
| 2018/0261882 A1 | 9/2018 | Chang et al. | |
| 2019/0100903 A1 | 4/2019 | Panda et al. | |
| 2019/0234053 A1 | 8/2019 | Kim et al. | |
| 2019/0323714 A1 | 10/2019 | Cui | |
| 2020/0009497 A1 | 1/2020 | Matuska et al. | |
| 2020/0206679 A1 | 7/2020 | Stuckenberg | |
| 2020/0283997 A1 | 9/2020 | Salloum et al. | |
| 2020/0316514 A1 | 10/2020 | Fuchs et al. | |
| 2020/0361965 A1* | 11/2020 | Yaghi | C02F 1/14 |
| 2020/0363078 A1 | 11/2020 | Mulet et al. | |
| 2021/0062478 A1 | 3/2021 | Friesen et al. | |
| 2021/0156124 A1* | 5/2021 | Yaghi | B01D 53/0462 |
| 2021/0237535 A1 | 8/2021 | Goel et al. | |
| 2021/0283528 A1 | 9/2021 | Pokorny et al. | |
| 2021/0283574 A1 | 9/2021 | Yaghi et al. | |
| 2022/0001328 A1 | 1/2022 | Yoon et al. | |
| 2022/0106203 A1* | 4/2022 | Marchon | C02F 1/18 |
| 2022/0170247 A1* | 6/2022 | Yaghi | B01D 53/0415 |
| 2022/0389691 A1 | 12/2022 | Kuo et al. | |
| 2023/0063572 A1 | 3/2023 | Kapustin | |
| 2023/0264138 A1 | 8/2023 | McGrail et al. | |

FOREIGN PATENT DOCUMENTS

| | | |
|---|---|---|
| CN | 106029674 A | 10/2016 |
| CN | 1077722290 A | 2/2018 |
| CN | 114182784 A | 3/2022 |
| EP | 2507247 A1 | 10/2012 |
| EP | 3721971 A1 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | WO 2015/127033 A1 | 8/2015 |
| WO | WO2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/162894 A1 | 8/2021 |
| WO | WO 2023/146800 A1 | 8/2023 |
| WO | WO 2023/181058 A1 | 9/2023 |

OTHER PUBLICATIONS

Clus et al. Study of dew water collection in humid tropical islands. Hydrol., Oct. 2008, 361(1-2):159-171.

Fathieh et al. Practical water production from desert air. Sci. Adv., Jun. 2018, 4(6):eaat3198.

Gleick. Water in Crisis: a Guide to the World's Fresh Water Resources. Chapter 2, pp. 13-24. Aug. 1993, Oxford University Press, New York, USA.

Klemm et al. Fog as a Fresh-Water Resource: Overview and Perspectives. Ambio, May 2012, 41(3):221-234.

Lee et al. Water harvest via dewing. Langmuir, Jun. 2012, 28(27):10183-10191.

Muselli et al. Dew water collector for potable water in Ajaccio (Corsica Island, France). Atmos. Res., Sep. 2002,64,297-312.

Park et al. Optimal Design of Permeable Fiber Network Structures for Fog Harvesting. Langmuir, Oct. 2013, 29(43):13269-13277.

Schemenauer et al. A Proposed Standard Fog Collector for Use in High-Elevation Regions. Appl. Meteorol., Nov. 1994, 33(11):1313-1322.

Wahlgren. Atmospheric Water Vapour Processor Designs for Potable Water Production: a Review. Water Res., Jan. 2001, 35(1):1-22.

PCT International Patent Application No. PCT/US22/26153, International Search Report and Written Opinion of the International Searching Authority dated Jul. 28, 2022, 18 pages.

(56) References Cited

OTHER PUBLICATIONS

PCT International Patent Application No. PCT/US19/63442, International Search Report and Written Opinion of the International Searching Authority dated Jan. 22, 2020, 7 pages.
PCT International Patent Application No. PCT/US20/14647, International Search Report and Written Opinion of the International Searching Authority dated May 5, 2020, 11 pages.
PCT International Patent Application No. PCT/US20/53052, International Search Report and Written Opinion of the International Searching Authority dated Jan. 4, 2021, 10 pages.
PCT International Patent Application No. PCT/US21/16261, International Search Report and Written Opinion of the International Searching Authority dated Apr. 16, 2021, 8 pages.
PCT International Patent Application No. PCT/US21/47491, International Search Report and Written Opinion of the International Searching Authority dated Dec. 7, 2021, 9 pages.
PCT International Patent Application No. PCT/US22/12990, International Search Report and Written Opinion of the International Searching Authority dated Apr. 7, 2021, 14 pages.
Ding et al. Carbon capture and conversion using metal—organic frameworks and MOF-based materials. Chem. Soc. Rev., May 2019, 48(2):2783-2828.
Fracaroli et al. Metal—Organic Frameworks with Precisely Designed Interior for Carbon Dioxide Capture in the Presence of Water. Am. Chem. Soc., Jun. 2014, 136, pp. 8863-8866.
Furukawa et al. Water Adsorption in Porous Metal—Organic Frameworks and Related Materials. J. Am. Chem. Soc., Mar. 2014, 136, 11, 4369-4381.
Hanikel et al. Rapid Cycling and Exceptional Yield in a Metal—Organic Frameworks for Water Harvester. ACS Cent. Sci., Aug. 2019, 5(10):1699-1706.
Kalmutzki et al. Metal—Organic Frameworks for Water Harvesting from Air; Adv. Mater. Sep. 2018, 30(37):1704304.
Kim et al. Water harvesting from air with metal—organic frameworks powered by natural sunlight. Science, Apr. 2017, 356:430-434.
Kummer et al. A functional full-scale heat exchanger coated with aluminum fumarate metal—organic framework for adsorption heat transformation. Ind. Eng. Chem. Res., Jul. 2017, 56(29):8393-8398.
Li et al. Incorporation of Alkylamine into Metal—Organic Frameworks through a Brønsted Acid-Base Reaction for CO2 Capture. ChemSusChem., Oct. 2016, 9(19):2832-2840.
Tu et al. Progress and Expectation of Atmospheric Water Harvesting. Joule, Aug. 2018, 2(8):1452-1478.
Zhou et al. Atmospheric Water Harvesting: a Review of Material and Structural Designs. ACS Materials Lett., May 2020, 2(7):671-684.
Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.
Fang et al. One-Pot Synthesis of Two-Linker Mixed Al-Based Metal—Organic Frameworks for Modulated Water Vapor Adsorption. Cryst. Growth Des., Aug. 2020, 20, 10, 6565-6572.
Global Cooling Prize. Transaera and partner Haier. Website, https://globalcoolingprize.org/transaera-inc/, originally downloaded Nov. 21, 2022, 3 pages.
PCT International Patent Application No. PCT/US22/41142, International Search Report and Written Opinion of the International Searching Authority dated Jan. 20, 2023, 12 pages.
PCT International Patent Application No. PCT/US23/33098, International Search Report and Written Opinion of the International Searching Authority dated Nov. 30, 2023, 11 pages.
U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. Jan. 2021/551201, Substantive Examination Report dated Sep. 6, 2023, 6 pages.
U.S. Appl. No. 18/077,417, Office Action mailed Jan. 17, 2024.
PCT International Patent Application No. PCT/US23/33101, International Search Report and Written Opinion of the International Searching Authority dated Feb. 8, 2024, 16 pages.
U.S. Appl. No. 17/763,413, Office Action mailed Feb. 6, 2024.
U.S. Appl. No. 18/077,417, Office Action mailed Mar. 29, 2024.
U.S. Appl. No. 18/371,700, Office Action mailed Apr. 18, 2024.
PCT International Patent Application No. PCT/IN23/50258, International Search Report and Written Opinion of the International Searching Authority dated Jul. 4, 2023, 10 pages.
Japanese Patent Application No. 2021-529709, Office Action dated Nov. 21, 2023, 6 pages.

* cited by examiner

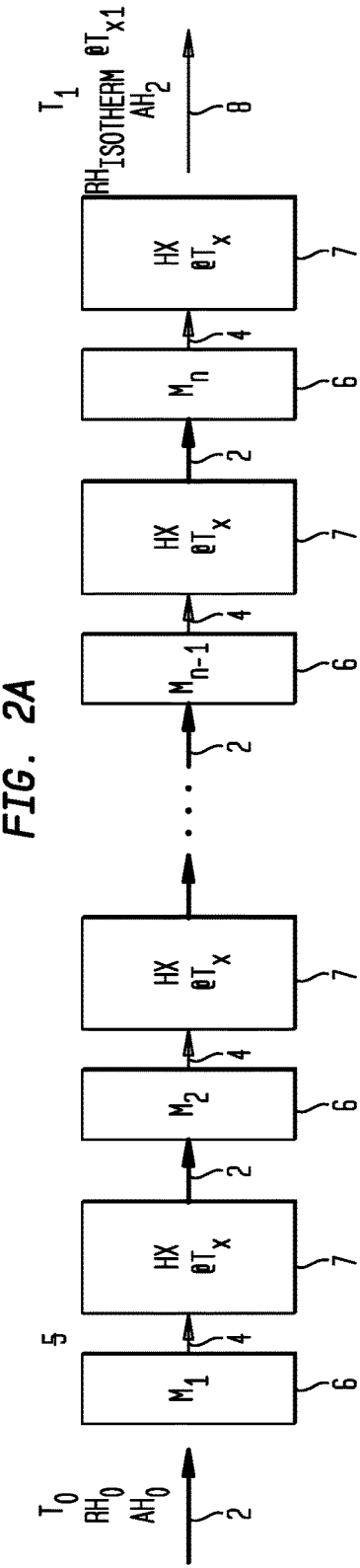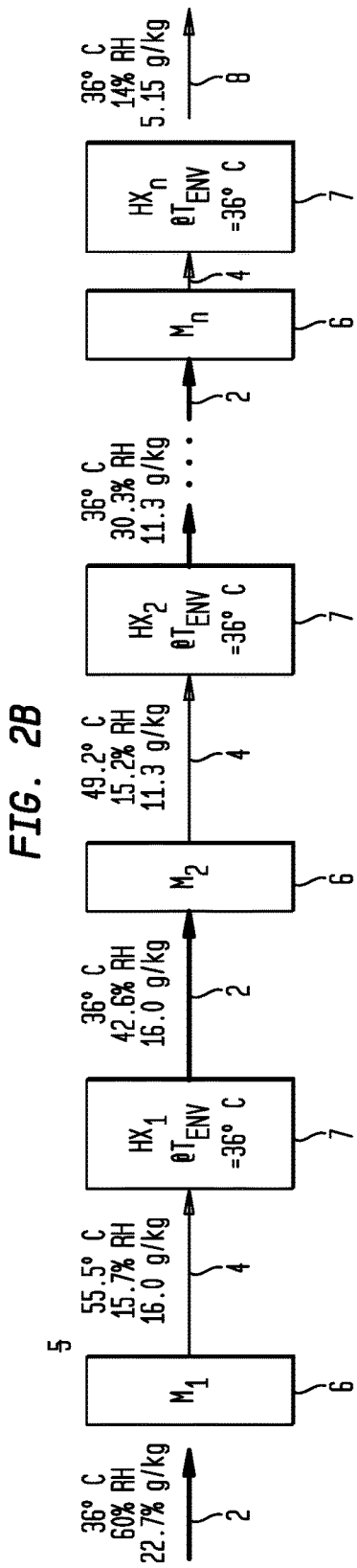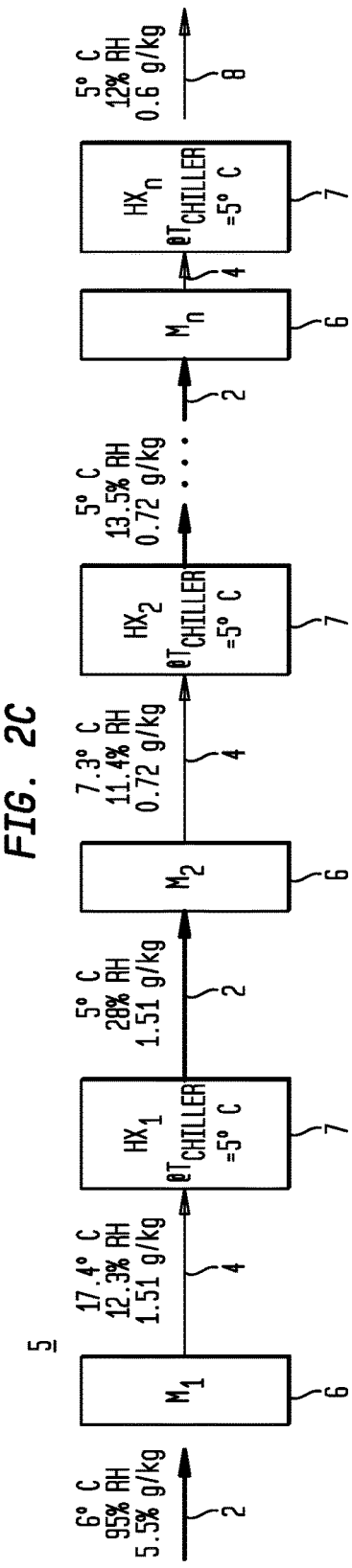

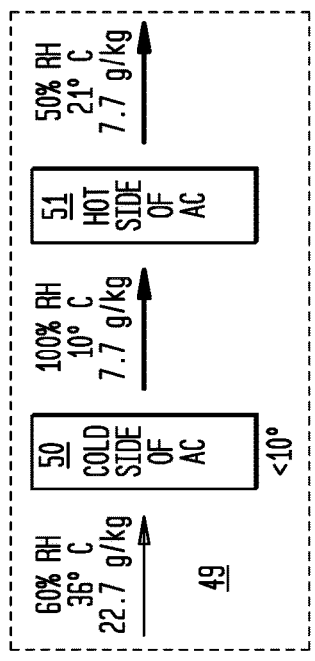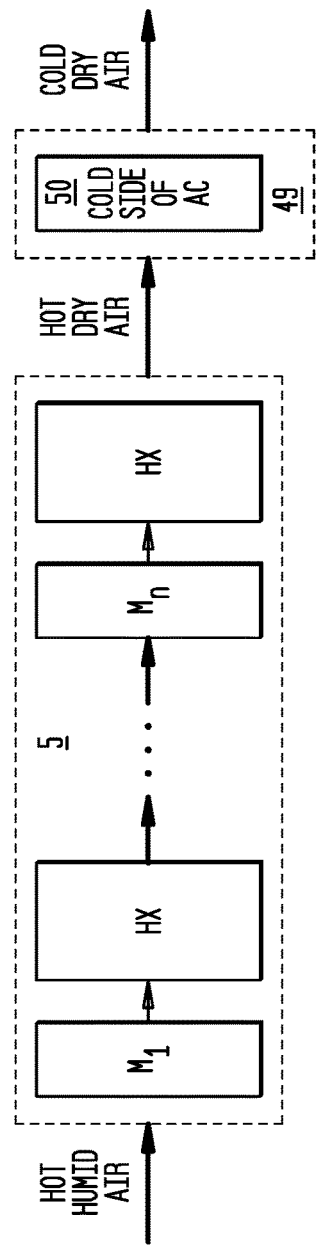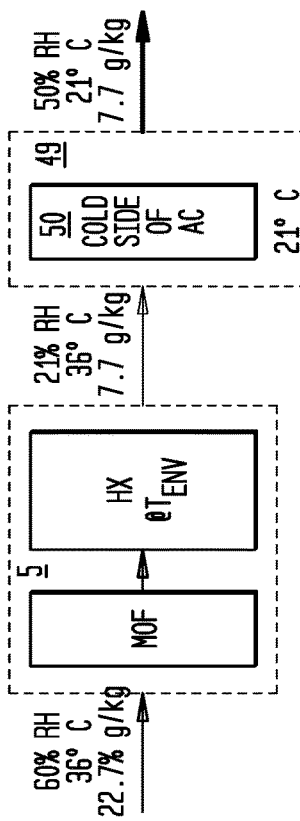

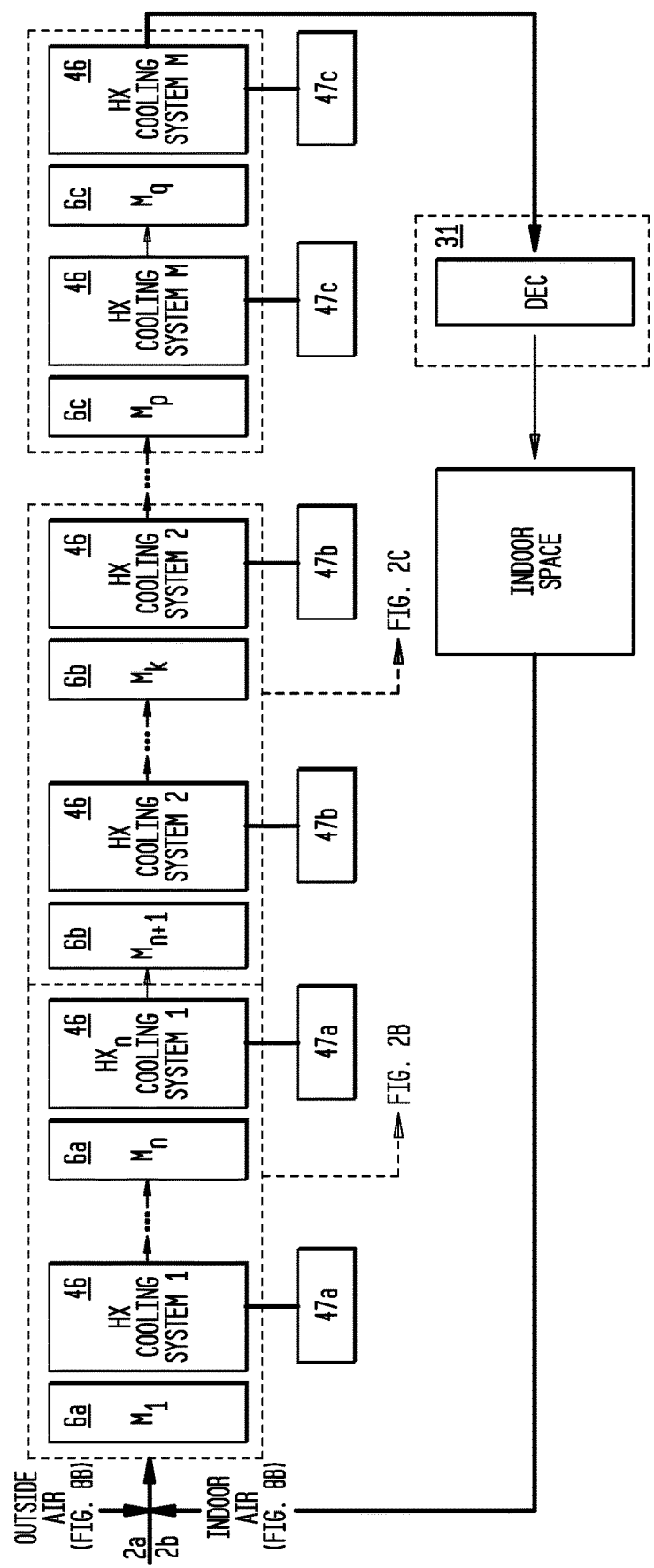

us 12,098,530 B1

WATER HARVESTER ADSORPTION ENTHALPY REMOVAL SYSTEM

This United States Patent Application is a continuation of U.S. patent application Ser. No. 18/380,111, filed Oct. 13, 2023, hereby incorporated by reference herein.

FIELD OF THE INVENTION

Generally, a water harvester useful in harvesting water from supply air. Specifically, a water harvester configured to remove the heat gained during adsorption of water by the water capture material contained in the water capture modules of the water harvester. Removal of the enthalpy associated with the adsorption of water by the water capture material can lower the equilibrium temperature of the water capture material and increase the driving potential of adsorption by the water capture material and correspondingly increase the difference in absolute humidity between the supply air passing into a water capture module and the discharge air passing out of a water capture module.

BACKGROUND OF THE INVENTION

In physics and chemistry, there are two types of functions: state functions and path functions. Path functions depend on the transition a system undergoes from the initial state to the final state. The most common path functions are heat (Q) and work (W).

State functions are independent of the path and rely on the current equilibrium state of the system. State functions include pressure, temperature, volume, enthalpy, and entropy. Enthalpy, H, is a thermodynamic property that describes the heat lost or gained in a system. The change in enthalpy, $\Delta H$, is equal to the sum of the change in internal energy, $\Delta U$, plus the product of the constant pressure, P, and the change in volume, $\Delta V$.

$$\Delta H = \Delta U + P\Delta V$$

During a chemical reaction, energy is either gained or released. Since enthalpy is a state function, the change in enthalpy during a chemical reaction only depends on the difference between the final and initial enthalpies.

$$\Delta H = H_{final} - H_{initial}$$

The initial enthalpy represents the enthalpy of the reactants, whereas the final enthalpy represents the enthalpy of the products. Thus, the enthalpy change of a reaction can be described by the following equation:

$$\Delta H_{rxn} = H_{products} - H_{reactants}$$

When the enthalpy of the products is greater than the enthalpy of the reactants, $\Delta H$ is positive, indicating that the reaction absorbs heat and is endothermic. When the enthalpy of the reactants is greater than the enthalpy of the products, $\Delta H$ is negative, and the reaction releases heat and is exothermic.

Now with primary reference to FIG. 1A, adsorption of water (1) carried by supply air (2) by water capture material (3) is an exothermic process accompanied with release of adsorption enthalpy, that is: $\Delta H$ is negative. The increased temperature of the water capture material (2) during the adsorption of water (1) ($T_1 > T_0$) raises the equilibrium temperature of the water capture material (3) which lowers the driving potential of adsorption by the water capture material (3) and correspondingly decreases the difference in absolute humidity ($\Delta H_0/\Delta H_1$) between the supply air (2) passing through the water capture material (3) (arrow directed into the water capture material (3)) and the discharge air (4) passing out of the water capture material (3) (arrow directed outward from the water capture material (3)).

Now, with primary reference to the illustrative example of FIG. 1B, the supply air (2) can have a temperature of 360 Centigrade ("C") (96.8° F.) with a relative humidity ("RH") of 60% and an absolute humidity ("$\Delta H$") of 22.7 grams ("g") of water per kilogram ("kg") of dry air. Adsorption of water (1) from the supply air (2) takes place in the water capture material (3). In this illustrative example, the water capture material (3) can comprise a metal-organic framework ("MOF"), and in the instant example, the water capture material (3) can comprise an MOF-303. The process of adsorption of water by MOF-303 can raise the equilibrium temperature of adsorption of the MOF-303 to 55° C. As a result, the RH of the discharge air (4) can be 15.7% and the $\Delta H$ of the discharge air (4) can only be lowered to 16 g/kg.

SUMMARY OF THE INVENTION

Now, with primary reference to FIG. 2A, particular embodiments of a water harvester (5) can include one or more water capture modules (6) (M1 . . . $M_n$) (also referred to as "module(s)") each containing one or more water capture material(s) (3). Each water capture module (6) can be configured to deliver the discharge air (4) to the hot side of a discharge air heat exchanger (7). The discharge air (4) passing through the discharge heat exchanger (7) can transfer heat to the cold side of the discharge air heat exchanger (7) to reduce the temperature of the discharge air (4) from the water capture module (6). A plurality of water capture modules (6) (M1 . . . $M_n$) can be fluidically coupled in series with the first water capture module (6) (M1) in the series receiving supply air (2) having a temperature $T_0$, a relative humidity $RH_0$ and an absolute humidity $\Delta H_0$. The hot side of a discharge air heat exchanger (7) can receive the discharge air (4) from each of the water capture modules (6) (M1 . . . $M_n$) and cool the discharge air (4) prior to delivery as supply air (2) to the next in the series of water capture module (6). The reduction in temperature of the discharge air (4) reduces the equilibrium temperature of adsorption of the water capture material (3) contained in the next of the series water capture modules (6) and correspondingly substantially reduces $RH_{1 \, isotherm}$ @ $T_1$ and $\Delta H_1$ of the discharge air (4) from the last in the series of water capture modules (6) ($M_n$) as compared to the $RH_0$ and $\Delta H_0$ of the supply air (2) entering the first in the series of water capture modules (6) (M1), or as compared to the discharge air (4) from the last in the series of water capture modules (6) ($M_n$) without the use of one or more discharge air heat exchanger(s) (7).

Now, with primary reference to FIG. 2B, as an illustrative example, the supply air (2) entering the first in a series of water capture modules (6) can have a temperature of 36° C. (96.8° F.) with a relative humidity (RH) of 60% and an absolute humidity (AH) of 22.7 grams of water per kilogram ("g/kg") of dry air. The supply air (2) can pass through a plurality of water capture modules (6) (M1 . . . $M_n$) containing water capture material (3). The water capture material (3) can comprise a metal-organic framework ("MOF"), and in the instant example, the water capture material (3) comprises MOF-303. The process of adsorption of water by MOF-303 raises the equilibrium temperature of MOF-303 to 55.5° C. As a result, the discharge air (4) from the first in the series of water capture modules (6) (M1) has an RH 15.7% at 55.5° C. and the $\Delta H$ of the discharge air (4)

can only be lowered to 16.0 g/kg. In embodiments in which each of a plurality of water capture modules (6) (M1 ... $M_n$) disposed in a series delivers the respective discharge air (4) to the hot side of a discharge air heat exchanger (7) (HX1 ... $HX_n$) having a cold side at an ambient temperature of 36° C. (HX@$T_{env}$36° C.), the supply air (2) from the discharge air heat exchanger (7)(HX@$T_{env}$36° C.) can be reduced to 36° C. and correspondingly the equilibrium temperature of water capture material (3) in each of the plurality water capture modules (6) in a series can be reduced to 36° C. yielding a substantial stepwise reduction of the RH and AH from each water capture module (6) and yielding conditioned air (8) from the final discharge air heat exchanger (7) ($HX_n$@$T_{env}$36° C.) having a RH at 36° C. of 14% and an AH of 5.2 g/kg.

Now, with primary reference to FIG. 2C, in particular embodiments, each of a plurality of water capture modules (6) can be configured to deliver the respective discharge air (4) to the hot side of a discharge air heat exchanger (7) having a cold side at 5° C. (HX@$T_{chiller}$ 5° C.), the supply air (2) from the heat exchanger (HX@$T_{chiller}$5° C.) can be reduced to 5° C. and correspondingly the equilibrium temperature of water capture material (3) in each of the plurality water capture modules (6) in a series can be reduced to 5° C. yielding a substantial stepwise reduction of the RH and AH from each water capture module (6) and yield a conditioned air (8) from the final discharge air heat exchanger (7) ($HX_{n@}T_{chiller}$5° C.) capture module having a RH at 5° C. of 12% and an AH absolute humidity of 0.6 g/kg.

Thus, implementation of discharge air heat exchangers (7), as described above, improved the driving potential of adsorption of the water capture material (3) from AH 6.7 g/kg without use of the discharge air heat exchangers (7) depicted in FIG. 1B to 17.6 g/kg with HX@$T_{env}$36° C.

Naturally, further objects of the invention are disclosed throughout other areas of the specification, drawings, photographs, and claims.

BRIEF DESCRIPTION OF THE DRAWINGS

FIG. 2A is a block flow diagram generally illustrating a plurality of water capture modules (M1 ... $M_n$) fluidically coupled in a series in which the discharge air from each water capture module passes through a discharge air heat exchanger prior to intake by the next water capture module in the series.

FIG. 2B is a block flow diagram generally illustrating a plurality of water capture modules (M1 ... $M_n$) fluidically coupled in series in which the discharge air from each water capture module passes through a discharge air heat exchanger having a cold side coupled to a passive cooling unit at 36° C., wherein the discharge air is cooled to 36° C. prior to intake by the next water capture module in the series.

FIG. 2C is a block flow diagram generally illustrating a plurality of water capture modules (M1 ... $M_n$) fluidically coupled in series in which the discharge air from each water capture module passes through a discharge air heat exchanger having a cold side coupled to an active cooling unit at 5° C., wherein the discharge air is cooled to 5° C. prior to intake by the next water capture module in the series.

FIG. 6A is a block flow diagram of latent and sensible cooling associated with a conventional vapor-compression cooling unit.

FIG. 6B is a block flow diagram generally illustrating a conventional vapor-compression cooling unit retrofitted with an embodiment of the water harvester.

FIG. 6C is a block flow diagram of latent and sensible cooling associated with a conventional vapor-compression cooling unit retrofitted with an embodiment of the water harvester.

FIG. 8C is a block flow diagram of an embodiment of water harvester which combines the embodiment of the water harvester depicted in FIG. 2B and the water harvester depicted in FIG. 2C, wherein the supply air to the water harvester comprises in part outdoor air at ambient temperature and in part recirculated indoor air from an indoor space and the discharge air from the water harvester is delivered to an indoor space.

DETAILED DESCRIPTION OF THE INVENTION

The following description sets forth illustrative examples of an apparatus, and in particular embodiments a water harvester (5), methods of making a water harvester (5) and methods of using a water harvester (5). It should be recognized, however, that the examples of a water harvester (5) are not intended to limit the breadth or scope of the description, but instead to provide examples sufficient for a person of ordinary skill in the art to make and use the full breadth and scope of the invention.

Figure 3:
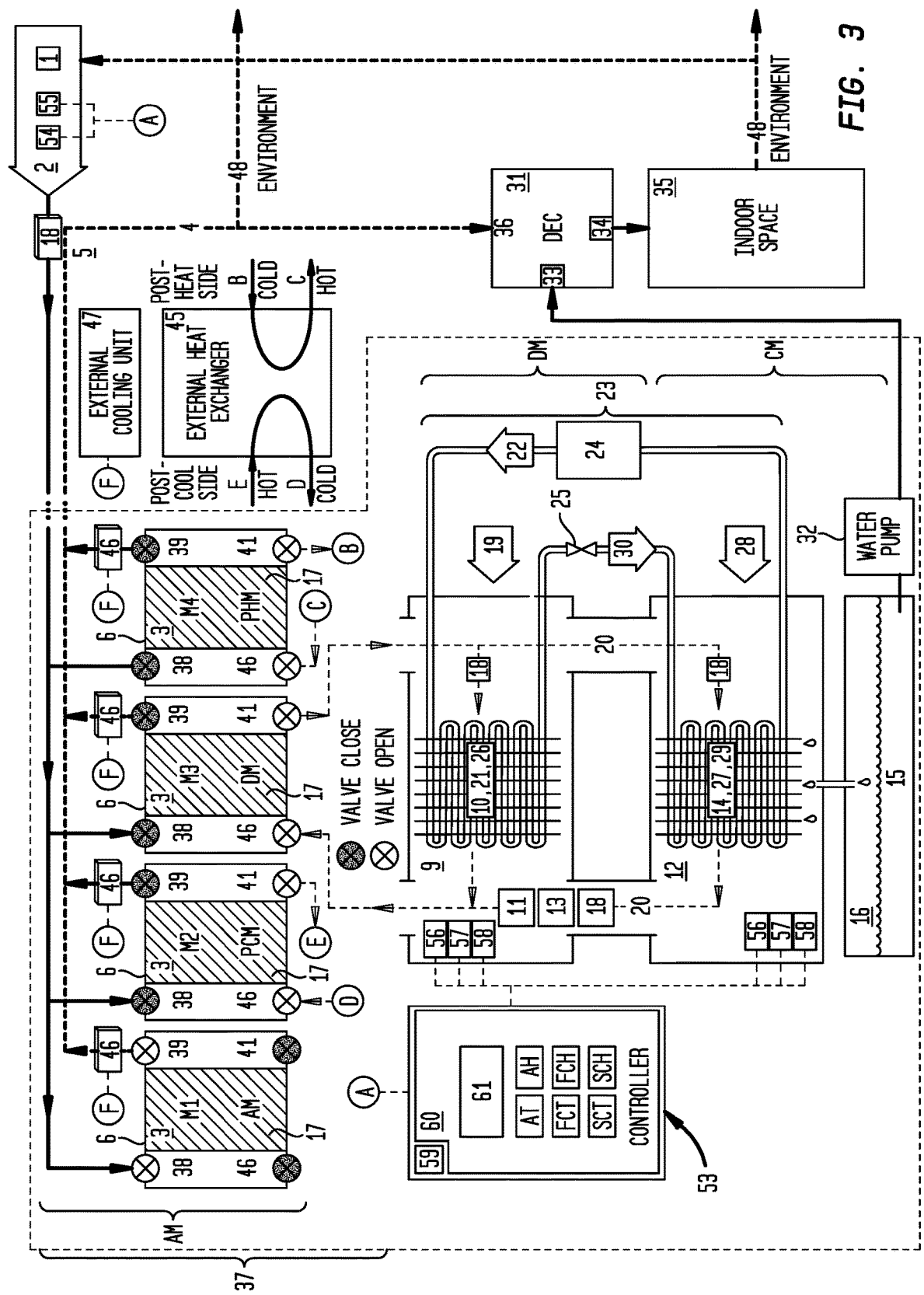
FIG. 3 is block flow diagram of a particular embodiment of the water harvester having a plurality of water capture modules (M1, M2, M3 and M4) with a valved conduit configurable to deliver supply air to each of the plurality of modules and configured to deliver discharge air to a discharge air heat exchanger, and wherein the a valved conduit is configured to dispose, at least one water capture module in a post-cool mode (PCM)(M2), at least one water capture module in a desorption mode (DM) (M3), at least one water capture module in a preheat mode (PHM)(M4).
Figure 4:
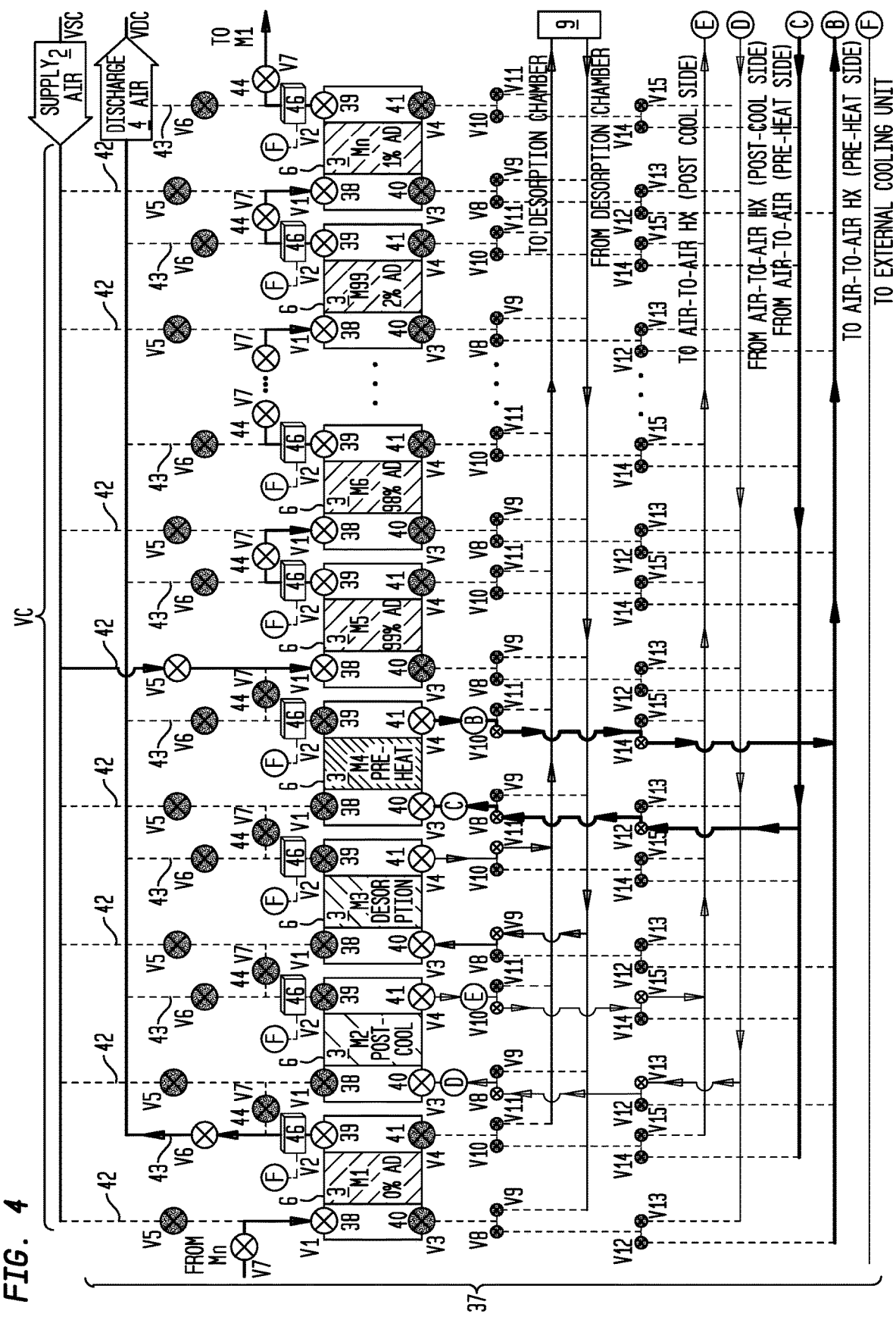
FIG. 4 is block flow diagram of a particular embodiment of the water harvester having a plurality of modules (M1 ... $M_n$) with a valved conduit configurable to deliver supply to each of the plurality of modules and configured to deliver discharge air to a discharge air heat exchanger, wherein the valved conduit configured to dispose a plurality of modules in an adsorption mode (AM)(M1 and M5 ... $M_n$), and wherein the a valved conduit is configured to dispose, at least one water capture module in a post-cool mode (PCM)(M2), at least one water capture module in a desorption mode (DM) (M3), at least one water capture module in a preheat mode (PHM)(M4).
Figure 5:
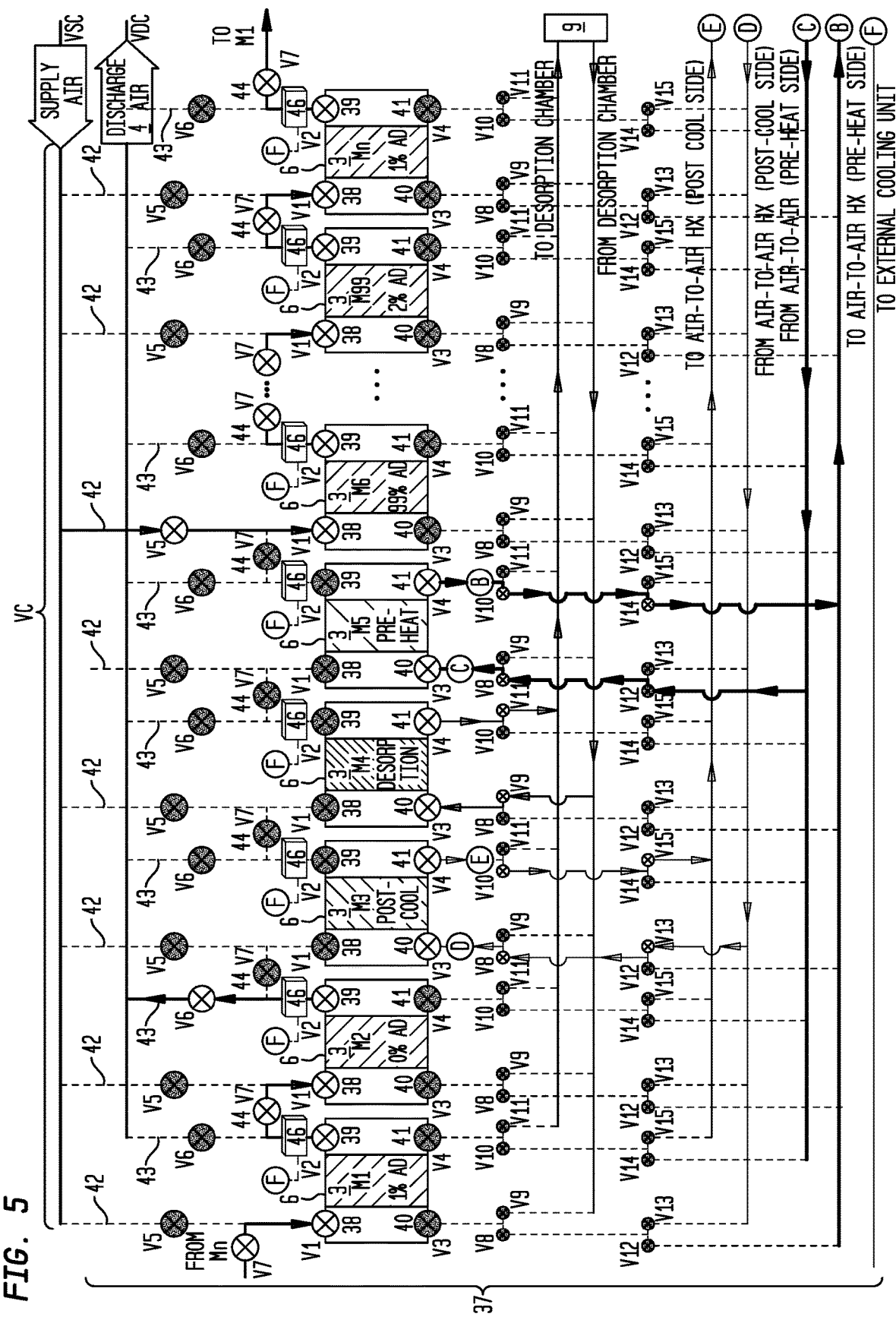
FIG. 5 is block flow diagram of a particular embodiment of the water harvester having a plurality of modules (M1 ... $M_n$) with a valved conduit configurable to deliver supply to each of the plurality of modules and configured to deliver discharge air to a discharge air heat exchanger, wherein the valved conduit configured to dispose a plurality of modules in an adsorption mode (AM)(M1, M2 and M6 ... $M_n$), and wherein the a valved conduit is configured to dispose, at least one water capture module in a post-cool mode (PCM)(M3), at least one water capture module in a desorption mode (DM) (M4), at least one water capture module in a preheat mode (PHM)(M5).

Now, with primary reference to FIGS. 3 through 5, embodiments of the water harvester (5) can include one or more of: a plurality of water capture modules (6) (M1 ... M4 or M1 ... $M_n$) each containing water capture material (3) which adsorbs water (1) in an adsorption mode (AM) of the water harvester (5); a first chamber (9) thermally coupled to a heating source (10), wherein the first chamber (9) can be fluidically coupled to one or more of the plurality of modules (6) (M1 ... M4 or M1 ... $M_n$) to heat the water capture material (3) to desorb water vapor (11) from the water capture material (3) during a desorption mode (DM) of the water harvester (5); a second chamber (12) fluidically coupled to the first chamber (9), wherein the water vapor (11) desorbed from the water capture material (3) can be carried by a recirculated airflow (13) between the first chamber (9) and the second chamber (12); and a cooling source (14) thermally coupled to the second chamber (12), wherein the cooling source (14) cools the water vapor (11) recirculated between the first chamber (9) and the second chamber (12), wherein the water vapor (13) recirculated between the first chamber (9) and the second chamber (12) condenses during a condensation mode (CM) of the water harvester (5) to liquid water (15) which can be collected in a water collection reservoir (16). It is intended that each of the described or enumerated elements of the invention can stand alone or in various combinations.

The term "supply air (2)" broadly encompasses a mixture of gases passed through one or more of the plurality of water capture modules (M1 ... M4 or M1 ... $M_n$), and in particular, can include ambient atmosphere, outdoor make-up air, recirculated indoor air, pre-cooled ambient atmosphere, pre-cooled make-up air, or partially dehumidified air, flue gases, or combinations thereof.

The term "recirculated airflow (11)" broadly encompasses a mixture of gases recirculated between the first chamber (9) and the second chamber (12).

Again, with primary reference to FIGS. 3 through 5, each of the plurality of water capture module(s) (6)(M1 ... M4 or M1 ... $M_n$) includes an adsorption bed of water capture material (3) comprising, comprising essentially of, or consisting of a composition that can adsorb water (1) from the supply air (2) in an adsorption mode (AM) of the water harvester (5), and which can desorb water vapor (11) in a desorption mode (DM) of the water harvester (5). Any suitable water capture material (3) can be used in embodiments of the water harvester (5). The water capture material (3) can be the same, equivalent, or different between each of the plurality of water capture modules (6) M1 ... M4 or M1 ... $M_n$) or combinations of different water capture materials (3) can be contained in one or more of the plurality of water capture modules (6) (M1 ... M4 or M1 ... $M_n$).

In particular embodiments, the water capture material (3) can be one or more metal-organic frameworks ("MOF(s)"). See for example: H. Furukawa et al., *Water Adsorption in Porous Metal-Organic Frameworks and Related Materials*, J. Am. Chem. Soc. 2014, 136, 11, 4369-4381. MOFs may be characterized by high water uptake and step-like characteristics for water uptake versus relative humidity (RH). In some variations, suitable water capture materials (3), including MOFs, can have such an isotherm step, which can be tailored to various climates. See for example: International Patent Publication No. WO2020112899, Multivariate and Other Metal-Organic Frameworks, and Uses Thereof. The step isotherm can enable water capture and release by MOFs in a very narrow range of relative humidity (RH).

In particular embodiments, different variations or combinations of MOF(s) can be utilized, including one or more of: MOF-303: Al(OH)(HPDC), where HPDC is 1H-pyrazole-3,5-dicarboxylate; CAU-10: Al(OH)(IPA), where IPA is isophthalate; MOF-801: $Zr_6O_4(OH)_4(fumarate)_6$; MOF-841: $Zr_6O_4(OH)_4(MTB)_6(HCOO)_4(H_2O)_2$; Aluminum Fumarate: Al(OH)(fumarate); MIL-160: Al(OH)(FDA), where FDA is 2,5-furandicarboxylate; MIL-53: Al(OH)(TPA), where TPA is terephthalate; or Aluminum Phosphate: AlPO4-LTA. In particular variations, the MOF(s) can have pore sizes in the range of about 0.5 nm to about 1 nm, or between about 0.7 nm to about 0.9 nm. In certain variations, the MOF(s) can have a hydrophilic pore structure. In certain variations, the MOF(s) can have a hydrophilic pore structure comprising acid and/or amine functional groups. In certain variations, the MOF(s) have one-dimensional channels that allow for reversible water adsorption. In some embodiments, the MOF can be mixed with a binder to improve its properties for adhesion to a substrate or support. Other suitable water capture material(s) (3) may include, as illustrative examples, certain molecular sieves (as one example, SAPO-34 a micropore zeolite, CAS No. 1318-02-1) and certain zeolites having the properties described above. Any combinations of the MOF(s) described herein, or other MOF9s), or other compositions capable of water adsorption and water desorption may also be used alone or in various combinations.

In particular embodiments, the water capture material (3) can be disposed on one or more structural element(s) (17) located inside of one or a plurality of water capture modules (6) (depicted in the example of FIG. 3 as parallel diagonal lines). The structural element(s) (17) can be configured to increase the surface area of the water capture material (3) exposed to the supply air (2) to enhance water (1) adsorption from the supply air (2) during the adsorption mode (AM) of the water harvester (5) or enhance heat transfer to the water capture material (3) during the desorption mode (DM) of the water harvester (5). In particular embodiments, the structural element(s) (17) can include plates or fins which can be independently coated on one or both sides with the water capture material (3). In some variations, the plates or fins can be arranged in spatial relationship, and in particular embodiments arranged substantially parallel to each other, with a gap existing between adjacent plates or fins. In particular embodiments, the gap between adjacent plates relative to the length of each plate can be adjusted to achieve contact with the supply air (2) to maximize water (1) adsorption by the water capture material (3) during the adsorption mode (AM) and water (1) desorption during the desorption mode (DM). In some variations, the gap between adjacent plates or fins can be about one percent (1%) to about five (5%) of the length of a plate or fin. In particular embodiments, the plates or fins can be coated with layers of the water capture material (3) each having a thickness between about 10 microns to about 500 microns, or between about 50 microns to 500 microns, or between about 10 microns to about 50 microns. In particular embodiments, layers of water capture material (3) in these thickness ranges can allow for faster adsorption and/or desorption as compared to thicker layers of water capture material (3). In other embodiments, the plates or fins can be coated with layers of the water capture material (3) each having a thickness of about 0.1 centimeter ("cm") to about 1 cm. Thickness in this range may allow for production of larger quantities of water vapor (11) during the desorption mode (DM) as compared to thinner layers. In certain embodiments, each layer of the water capture material (3) on the plates or fins can have a porosity. In some variations, the calculated porosity (the volume of the pores in the water capture material divided by the total volume of the water capture material×100) can be at least about 40%, at least about 50%, at least about 60%, at least about 70%, or at least about 80%; or about 40% to about 90%, about 50% to about 90%, about 40% to about 80%, about 50% to about 80%, or about 60% to about 80%. In other embodiments, the layer of the water capture material (3) can be substantially non-porous. In particular embodiments, the thickness of the layer of the water capture material (3) can be greater than the thickness of a plate for fin. In certain embodiments, only one side of the plate of fin may be coated with water capture material (3) with the thickness of the water capture material relative to the thickness of the plate of fin adapted to reduce or minimize the amount of energy used per unit of water released from the water capture material (3) during the desorption mode (DM) of the water harvester (3). Similarly, in certain embodiments, both sides of the plate or fin can be coated with the water capture material (3) and the ratio of the thickness of the first layer (e.g., first side layer) of the water capture material (3) to the thickness of the plate or fin to the thickness of the second layer (e.g., second side layer) of the water capture material (3) can be adapted to reduce or minimize the amount of energy used per unit of water (1) released from the water capture material (3) during the desorption mode (DM) of the water harvester (5). The plates or fins may be made of any suitable material, including any suitable metal or plastic. As an illustrative example, the plates can comprise one or more of aluminum, copper, iron, nickel, tungsten. In some variations, the plates comprise a solid metal. In other variations, each plate or fin can have a cellular design defining small channels or corrugates. In other variations, each plate or fin can further include topographic features that enhance water adsorption. Illustrative examples of topographical features include one or more of: granulation, perforations, arc holes, bumps, ridges, or grooves, or any combination thereof. In another variation, the plates or fins can comprise a mesh.

Again, with primary reference to FIGS. 3 through 5, in the adsorption mode (AM) of the water harvester (5), the water capture material (3) absorbs water (1) from a supply air (2) passing through one or more of the plurality of water capture modules (6). In particular embodiments, one or more air circulators (18) can operate to move the supply air (2) over the water capture material (3) contained in one or more of the plurality of water capture modules (6) to assist adsorption of water (1) by the water capture material (3). In particular embodiments, the air circulator (18) can move the supply air (2) at determined velocity through the water capture material (3). As an illustrative example, the water capture material (3) can be coated on adjacent structural elements (17), and the supply air (2) can pass through gaps between the structural elements (17) during the adsorption mode (AM). The adsorption mode (AM) as to one or more of the plurality of the water capture modules (6) can conclude when the water capture material (3) reaches a target level of water saturation or a target rate of water adsorption. In particular embodiments, the adsorption mode (AM) as to one or more of the plurality of water capture modules (6) can conclude which the discharge air (4) from one or more of the plurality of modules (3) reaches or exceeds a target level of relative humidity (RH) or a target level dew point (DP). In other embodiments, the adsorption mode (AM) as to one or more of the plurality of water capture modules (6) can conclude based on elapse of a period time. For example, as to one or more of the plurality of water capture modules (6) the water harvester (5) can switch from the adsorption mode (AM) to the desorption mode (DM) after elapse of a predetermined period of time. Understandably, various combinations of these events can be utilized to conclude the adsorption mode (AM) of one or more of the plurality of water capture modules (6).

Again, with primary reference to FIG. 3, the first chamber (9) can be thermally coupled to a heating source (10). The term "thermally coupled" broadly encompasses any mode of heat transfer to the first chamber (9) and can include one or more of conduction, convection, or radiation to heat the inside of the first chamber (9). The heating source (10) can comprise any mechanism, object, area, material, composition, byproduct, waste energy, or energy, and combinations thereof, which can transfer heat to or into the first chamber (9). In the illustrative example of FIG. 3, the heating source (10) resides inside of the first chamber (9), however, the heating source (10) can be disposed outside of the first chamber (9) and adapted to or configured to directly heat the structure of first chamber (9), or the heating source (10) can be disposed outside of the first chamber (9) and adapted to or configured to direct heated air (19) into the first chamber (9).

In the desorption mode (DM), the first chamber (9) can be fluidically coupled by an airflow path (20) (depicted in the example of FIG. 3 as a broken line with arrows pointing in the direction of airflow) to one or more of said plurality of water capture modules (6). The recirculated airflow (13) heated in the first chamber (9) recirculates in the airflow path (20) to heat the water capture material (3) contained in one or more of the plurality of water capture modules (6) fluidically coupled to the first chamber (9) to desorb water vapor (11) from the water capture material (3). Typically, the heating source (10) operates to heat the recirculated airflow (13) between the first chamber (9) and the one or more of the plurality of water capture modules (6) in the desorption mode (DM) to one or more temperatures in the range of about 80° C. (about 176° F.) to about 160° C. (about 320° F.). Specific temperatures within the temperature range can be dependent upon the water capture material(s) (3), or combinations of water capture materials (3), contained in the one or more of the plurality of water capture modules (6). However, this illustrative example is not intended to preclude embodiments which exploit temperatures outside the range to release water vapor (11) from the water capture material (3).

Again, with primary reference to FIG. 3, the heating source (10) can comprise or consist of a first heat exchanger (21) through which heated fluid (22) circulates. In particular embodiments, the first heat exchanger (21) can be disposed in the first chamber (9). The first heat exchanger (21) can be configured to transfer heat from the heated fluid (22) to the recirculated airflow (13) between the first chamber (9) and one or more of the plurality of water capture modules (6) in the desorption mode (DM). In particular embodiments, the heating source (10) can comprise a heat pump (23). A heat pump (23) can include one or more of: a compressor (24), an expansion valve (25), a condenser (26) (or hot-side heat exchanger), and an evaporator (27) (or cold-side heat exchanger). The compressor (24) can operate to compress a refrigerant resulting in a heated fluid (22) which can be circulated to the condenser (26). The condenser (26) can transfer heat to the first chamber (9) sufficient to release water vapor (11) from the water capture material (3) contained in one or more of the plurality of water capture modules (6) in the desorption mode (DM) of the water harvester (5). The condenser (26) (hot side of the heat exchanger) can be set to operate at one or more temperatures in the range of about 90° C. (about 194° F.) to about 160° C. (about 320° F.). In particular embodiments, the water vapor (11) desorbed from the water capture material (3) of the plurality of water capture modules (3) in the desorption mode (DM) can be released to the atmosphere.

Again, with primary reference to FIG. 3, embodiments of the water harvester (5) can include a second chamber (12) fluidically coupled to the first chamber (9). The water vapor (11) released from the water capture material (3) during the desorption mode (DM) can be carried in the recirculated airflow (13) in the airflow path (20) from the first chamber (9) to the second chamber (12) during the condensation mode (CM) of the water harvester (5). In particular variations, the desorption mode (DM) can operate independent of the condensation mode (CM) until reaching a target water vapor (11) concentration in the first chamber (9). The air circulator (18) can then operate to generate the recirculated airflow (13) between the first chamber (9) and the second chamber (12) of the water harvester (5). Recirculated airflow (13) between the first chamber (9) and the second chamber (12) can initiate the condensation mode (CM) of the water harvester (5). In particular embodiments, the adsorption mode (AM) as to one or more of the plurality of water capture modules (6) (M1 . . . M4), the desorption mode (DM) as one or more of the plurality of water capture modules (6) (M1 . . . M4), and the condensation mode (CM) can operate as independent events. In particular embodiments, the adsorption mode (AM) as to one or more of the plurality of water capture modules (6) (M1 . . . M4), the desorption mode (DM) as one or more of the plurality of water capture modules (6) (M1 . . . M4), and the condensation mode (CM) can operate concurrently, or in combinations of independent and concurrent events depending on the application.

Again, with primary reference to FIG. 3, a cooling source (14) can be thermally coupled to the second chamber (12). The cooling source (14) can operate to cool the water vapor (11) carried in the recirculated airflow (13) between said first chamber (9) and the second chamber (12) during the condensation mode (CM) of the water harvester (5). The cooling source (14) can sufficiently cool the water vapor (11) in or passing through the second chamber (12) to cause condensation of at least a portion of the water vapor (11) carried by the recirculated airflow (13) into liquid water (15). In particular embodiments, the cooling source (14) can be disposed to cool the structure of the second chamber (12) to a temperature lower than the dewpoint of the recirculated airflow (13) within the second chamber (12) to cause condensation of at least a portion of the water vapor (11) carried by the recirculated airflow (13) into liquid water (15). The second chamber (12) can be configured to increase the surface area of the internal surfaces of the second chamber (12) to increase condensation of water vapor (11) in the recirculated airflow (13) within the second chamber (12). In other embodiments, the cooling source (14) can be disposed inside of the second chamber (12) and the recirculated airflow (13) carrying water vapor (11) can pass over the cooling source (14) to cause condensation of at least a portion of the water vapor (11) within the second chamber (12) into liquid water (15). In particular embodiments, the cooling source (14) can comprise cooled air (28) produced by a machine or other process discrete from the water harvester (5) directed proximate to or into the second chamber (12). As an illustrative example, waste cold can be generated from the re-gasification of liquid natural gas from the frozen state. In other embodiments, the cooling source (14) can comprise a second heat exchanger (29) through which a cooled fluid (30) circulates. The second heat exchanger (29) can be disposed proximate to or inside the second chamber (12) to cool the recirculated airflow (13) carrying the water vapor (11) contained in or passing through the second chamber (12). The recirculated airflow (13) can be cooled to below the dewpoint to cause condensation of at least a portion of the water vapor (11) into liquid water (15). The liquid water (15) can be collected in a water collection reservoir (16). In particular embodiments, the liquid water (15) can be used as drinking water. In other particular embodiments, the liquid water (15) can be used for direct evaporative cooling (DEC) (31). In embodiments utilizing DEC (31), a water pump (32) can be connected to the collection reservoir (16). The water pump (32) can be configured to transfer liquid water (15) from the collection reservoir (16) to a sprayer (33) positioned in proximity to an indoor airflow inlet (34) of an indoor space (35). The sprayer (33) can operate to spray liquid water (15) into the indoor airflow (36) to further lower temperature and/or raise the RH and AH of the indoor airflow (36) passing into the indoor space (35).

Again, with primary reference to FIG. 3, in particular embodiments, the cooling source (14) can be an evaporator (27) of a heat pump (23). An expansion valve (25) can be configured to receive the heated fluid (22) from the condenser (26). The expansion valve (25) can operate to allow expansion of the heated fluid (22) to produce a cooled fluid (30). The cooled fluid (30) can circulate to the evaporator (27). The evaporator (27) (cold-side heat exchanger) can be set to operate at temperatures in the range of about 30° C. (about 86° F.) to about 95° C. (about 203° F.). The evaporator (27) can be associated with the second chamber (12) to transfer heat, whether directly or indirectly, from the recirculated airflow (13) carrying water vapor (11) contained in or passing through the second chamber (12). As illustrative examples, the evaporator (27) can be disposed to transfer heat from one or more of: the structure of the second chamber (12), from structural elements within the second chamber (12), from the recirculated airflow (13) within the second chamber (12), or otherwise disposed to cause a decrease in temperature of the recirculated airflow (13) sufficient to cause condensation of at least a portion of the water vapor (11) carried by the recirculated airflow (13) in the condensation mode (CM) of the water harvester (5).

Now, with primary reference to FIGS. 3 through 5, embodiments of the water harvester (5) can include a reconfigurable airflow path (37) interconnecting the plurality of water capture modules (6). The reconfigurable airflow path (37) allows one or more of the plurality of modules (6) to be fluidically coupled to the first chamber (9) during the desorption mode (DM) of the air water harvester (5) while one or more of the plurality of modules (6) remain fluidically coupled, connected or interconnected to the supply air (2) to independently or concurrently operate in the adsorption mode (AM) of the water harvester (5).

In particular embodiments, each of the plurality of water capture modules (6) can be fluidically coupled to an adsorption airflow inlet (38) and an adsorption airflow outlet (9), wherein the adsorption airflow inlet (38) and the adsorption airflow outlet (39) remain open to allow the supply air (2) to pass into one or more of the plurality of water capture modules (6) and to allow the discharge air (4) to egress from one or more of the water capture modules (6) during the adsorption mode (AM). In particular embodiments, the plurality of water capture modules (6) in the adsorption mode (AM) can be coupled by the reconfigurable airflow path (37) to concurrently in parallel receive the supply air (2). In particular embodiments, the plurality of water capture modules (6) in the adsorption mode (AM) can be coupled by the reconfigurable airflow path (37) in series (as shown in the illustrative example of FIGS. 4 and 5). During operation of a plurality of water modules (6) fluidically coupled in series, the reconfigurable airflow path (37) can be configured to circulate the supply air (2) to the adsorption airflow inlet (38) of a first in the series of a plurality of water capture modules (6) containing water capture material (3) having greatest water saturation (shown in the example of FIG. 4 as module M5) with the discharge air (4) egressing from the adsorption airflow outlet (39) of the first in the series of a plurality water capture modules (6) into the adsorption air inlet (38) of the second in the series of a plurality of water capture modules (6) (shown in the example of FIG. 4 as module M6), and repeated through the series of the plurality of water capture modules (6), whereby the supply air (2) passes to a last in the series of the plurality of water capture modules (6) containing water capture material (3) having least water saturation (shown in the example of FIG. 4 as module M1). The discharge airflow (4) egresses from the adsorption airflow outlet (39) of the last in the series of the plurality of water capture modules (6).

Again, with primary reference to FIGS. 3 thorough 5, each of the one or more of plurality of water capture modules (6) include a desorption airflow inlet (40) and a desorption airflow outlet (41). In the adsorption mode (AM), the adsorption airflow inlet (40) and the adsorption airflow outlet (412) remain open to allow supply air (2) to flow though the corresponding water capture module (6), while the desorption airflow inlet (40) and a desorption airflow outlet (41) remain closed. In the desorption mode (DM), the desorption airflow inlet (40) and the desorption airflow outlet (41) remain open to allow recirculated airflow (13) from the first chamber (9) to pass through the water capture material (3) of the corresponding water capture module (6) while the adsorption airflow inlet (38) and the adsorption airflow outlet (39) remain closed.

Now, with primary reference to FIGS. 3 and 4, the reconfigurable airflow path (37) can dispose one or more of the plurality of water capture modules (6) in the desorption mode (DM) (shown in FIGS. 3 and 4 as module M3) in which the adsorption airflow inlet (38) and the adsorption airflow outlet (39) remain closed and the desorption airflow inlet (40) and the desorption airflow outlet (41) remain open to fluidically couple one of the plurality of modules (6) (shown in FIGS. 3 and 4 as module M3) to the first chamber (9). The reconfigurable airflow path (20) can concurrently fluidically couple one or more of the plurality of water capture modules (6) (shown in FIG. 3 as module M1 and shown in FIG. 4 in serial order modules M5 through $M_n$ and M1) to receive the supply airflow (2) in series to concurrently operate in the adsorption mode (AM) while one or more of the plurality of water capture modules (6) (shown in FIG. 4 as M3) operates in the desorption mode (DM).

Again, with primary reference to FIGS. 3 and 4, in particular embodiments of the water harvester (5), the plurality of water capture modules (6) can be fluidically coupled, connected or interconnected by a plurality of conduits and valves (also identified as one of V1 . . . V15) (also referred to as a "valved conduit") (VC). In the illustrative examples, each of the plurality of water capture modules (6) can be fluidically coupled to a valved adsorption airflow inlet (38) (V1) and a valved adsorption airflow outlet (39) (V2). The valved adsorption airflow inlet (38) (V1) and a valved adsorption airflow outlet (39) (V2) remain open in the adsorption mode (AM) of the plurality of water capture modules (6). In particular variations, in which the water harvester (5) operates a desorption mode (DM), or further includes the condensation mode (CM), each of the plurality of water capture modules (6) can be fluidically coupled to a valved desorption airflow inlet (40) (V3) and a valved desorption airflow outlet (41) (V4), wherein the valved desorption airflow inlet (40) (V3) and the valved desorption airflow outlet (41) (V4) remain open, and wherein the valved adsorption airflow inlet (38) (V1) and the valved adsorption airflow outlet (39) (V2) remain closed during the desorption mode (DM). The valved conduit (VC) can further provide a valved supply conduit (VSC) having a valved supply branch (42) (V5) to each valved adsorption airflow inlet (38) (V1). The valved conduit (VC) can further provide a valved discharge conduit (VDC) having a valved discharge branch (43) (V6) from each valved adsorption airflow outlet (39) (V2). The valved conduit (VC) can further include a valved lateral branch (44) (V7) interconnecting a valved discharge branch (43) (V6) of a first of a plurality of water capture modules (6) to a valved supply branch (42) (V5) of a second of a plurality of modules (6).

Now, with primary reference to the illustrative example of FIGS. 4 and 5, in particular embodiments once the desorption mode (DM) concludes for one or more of the plurality of water capture modules (6), the reconfigurable airflow path (37) can switch one or more of the plurality of water capture modules (6) of the water harvester (5) from the desorption mode (DM) directly to the adsorption mode (AM) or in particular embodiments from the desorption mode (DM) to the adsorption mode (AM) after an intermediate step of cooling the water capture module (6) in post cool mode (PCM). Similarly, the reconfigurable airflow path (37) can switch one or more of the plurality of water capture modules (6) of the water harvester (5) from the adsorption mode (AM) directly to the desorption mode (DM), or in particular embodiments, to the desorption mode (DM) after an intermediate step of preheating the water capture module (6) in a preheat mode (PHM). The illustrative example of FIGS. 3 and 4, show that upon conclusion of the desorption mode (DM) of water capture module (6) (M3), the reconfigurable airflow path (37) switches water capture module (6) (M3) from the desorption mode (DM) to a post-cool mode (PCM) and switches water capture module (6) (M4) from a pre-heat mode (PHM) to the desorption mode (DM).

Now, with primary reference to FIGS. 3 through 5, in particular embodiments, the reconfigurable airflow path (37) can be extended from a desorption airflow inlet (40) and desorption airflow outlet (41) of a water capture module (6) to an external heat exchanger (45) (a shown in FIG. 1). In particular embodiments, the desorption airflow inlet (40) and desorption airflow outlet (41) of one or more of the plurality of water capture modules (6) can be coupled to the external heat exchanger (45) to generate an external exchanger airflow (E to D) through the one or more water capture modules (6) to cool the water capture module (6) in the post cool mode (PCM) after completion of the desorption mode (DM) and prior to initiation of the adsorption mode (AM). In particular embodiments, the desorption airflow inlet (40) and desorption airflow outlet (41) of one or more of the plurality of water capture modules (6) can be coupled to the external heat exchanger (45) to generate an airflow through the water capture module (6) (B to C) to preheat the water capture module (6) in the preheat mode (PHM) after completion of the adsorption mode (AM) and prior to initiation of the desorption mode (DM).

In particular embodiments, the cooler airflow from a water capture module (6) in the preheat mode (PHM) (in the example of FIG. 1 module M4) can pass through the external heat exchanger (4) from inlet port B to outlet port C and the hotter airflow from a water capture module (6) in post cool mode (PCM) can pass through the external heat exchanger (45) from port E to port D. The airflow passing from inlet port C to outlet port B can increase in temperature and be returned to the water capture module (6) in the preheat mode (PHM) (in the example of FIG. 1 module M4) to correspondingly raise the temperature of the water capture module (6) in the preheat mode (PHM). Conversely, the airflow passing from inlet port E to outlet port D of the external heat exchanger (45) can lower the temperature and be returned the water capture module (6) in the post cool mode (PCM) (in the example of FIG. 1 module M2) to correspondingly lower the temperature of the water capture module (6) in the post cool mode (PCM). Concurrently, one or more water capture modules (6) can be the desorption mode (DM) (in the example of FIGS. 3 and 4 module M3).

Now, with primary reference to FIG. 4, as to each of the valved desorption airflow inlet (40) (V3) and the valved desorption airflow outlet (41) (V4), the reconfigurable airflow path (37) can be respectively fluidically coupled to a pair of valves (V8 and V9) and (V10 and V11). Each one of valves V8 and V10 can be respectively fluidically coupled to another pair of valves (V12 and V13) and (V14 and V15). Each of valves V3, V4, V8, V9, V10, V11, V12, V13, V14, and V15 can be switched from a closed condition to an open condition to alter the flow path to each of a plurality of water capture modules (6) to operate in one of: the adsorption mode (AM), the post cool mode (PCM) the preheat mode (PHM) or the desorption mode (DM). As one illustrative example, in the post cool mode (PCM) (in the example of FIG. 4 water capture module M2), V3, V8 and V13 remain open to create a flow path between V3 and port D of the external heat exchanger (45) and V4, V10, and V15 remain open to create a flow path between V4 and port E of the external heat exchanger (45), wherein water capture module (6) (M2) delivers hotter air to port E of the external heat exchanger (45) and receives cooler air from port D of the external heat exchanger (45), thereby cooling water capture module (6) (M2) prior to be switched to the adsorption mode (AM). Remaining valves V9, V11, V12, and V14 remain closed.

As another illustrative example, in the preheat mode (PHM) of a water capture module (6) (in the example of FIG. 4 water capture module M4), V3, V8 and V12 remain open to create a flow path between V3 and port C of the external heat exchanger (45) and V4, V10, and V14 remain open to create a flow path between V4 and port B of the external heat exchanger (45), wherein water capture module (6) (M4) delivers cooler air to port C of the external heat exchanger (45) and receives hotter air from port B of the external heat exchanger (45), thereby preheating the water capture module (6) (M4) prior to be switched to the desorption mode (DM). Remaining valves V9, V11, V13 and V15 remain closed.

As another illustrative example, in the desorption mode (DM) (in the example of FIG. 4 module M3) V3, V9 remain open to create a flow path to the first chamber (9) and V4 and V11 remain open to create a flow path from the first chamber (9). Remaining valves V10, V12, V13, V14 and V15 remain closed.

As an illustrative example of the advantage of particular embodiments of the invention described above, in the instance in which the water capture material (3) comprises a MOF and the adsorption of water (1) from the supply air occurs at 20° C. (68° F.) and the desorption of water vapor (11) from the MOF occurs at 80° C. (176° F.), then the water capture module (6) containing the water capture material (3) must be heated from 20° C. (68° F.) to 80° C. (176° F.) to yield water vapor (11). The energy needed to raise the temperature of the water capture module from 20° C. (68° F.) to 80° C. (176° F.) can be obtained in whole or in part at no cost by using an embodiment of the external heat exchanger (45), as described above, to concurrently cool down a water capture module (3) in the post-cool mode (PCM) from 80° C. (176° F.) toward 20° C. (68° F.) and concurrently pre-heat a water capture module (3) in the preheat mode (PHM) from 20° C. (68° F.) toward 80° C. (176° F.). The equilibrium temperature X value between the water capture module in the post-cool mode (PCM) and the water capture module (3) in the pre-heat mode (PHM) will depend on the efficiency of the external heat exchanger (45) and the water capacity in both water capture module in the pre-heat mode (PHM) and the water capture module (3) in the post-cool mode (PCM).

As another illustrative advantage of particular embodiments of the invention described above, in the instance in which the water capture material (3) comprises a MOF-303 and the desorption mode (DM) occurs at 80° C. (176° F.), the at the end of the desorption mode (DM) the air in the desorption chamber (9) (first chamber) at 80° C. (176° F.) will have a RH of 18% corresponding to an AH of 56.75 g of water per kg of dry air. If the water capture module (3) transitions directly from the desorption mode (DM) to the adsorption mode (AM), the water vapor contained in the water capture module (3) is released back into the dehumidified airflow. However, if the water capture module (3) at the conclusion of the desorption mode (DM) transitions to the post-cool mode (PCM) the MOF-303 and the air about the MOF-303 can be cooled to a lower temperature of 40° C. (104° F.) forcing re-adsorption of the water (1) that was released during the desorption mode (DM) but not condensed back into the water capture module (3) and re-adsorbed by the MOF-303. As a result, the AH value of the air in the water capture module (3) in the post cool mode (PCM) can be only 6.6 g/kg of dry air at 40° C. (104° F.) and 15% RH. Thus, a considerably smaller amount of water (1) passes into the dehumidified airflow.

Now, with primary reference to FIG. 3, particular embodiments can further include a discharge heat exchanger (46) fluidically coupled to the adsorption airflow outlet (39) of one or more of the plurality of water capture modules (6) to receive the discharge air (4) passing from the adsorption airflow outlet (39) through the discharge heat exchanger hot side. The discharge heat exchanger cold side can receive airflow from an external cooling unit (47). The external cooling unit (47) can comprise a passive cooling unit or an active cooling unit. The adsorption enthalpy associated with adsorption of water by the water capture material (3) in the adsorption mode (AM) in whole or in part can be transferred to the discharge air heat exchanger cold side and exhausted to the environment (48).

Figure 1A:
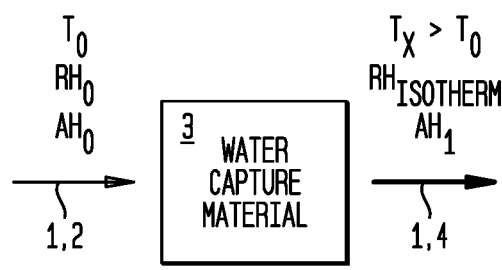
FIG. 1A is a block diagram generally illustrating the relationship of temperature T, relative humidity RH and absolute humidity ΔH between the supply air to a water capture module containing water capture material and the discharge air from the water capture module.
Figure 1B:
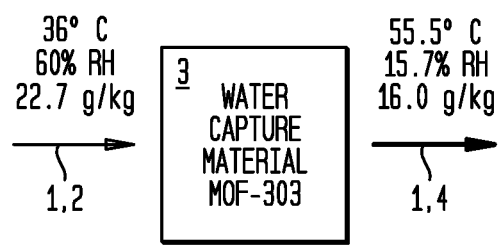
FIG. 1B is a block flow diagram illustrating the illustrating the relationship of temperature T, relative humidity RH and absolute humidity ΔH between the supply air to a water capture module containing water capture material MOF-303 and the discharge air from the water capture module containing water capture material MOF-303.

As depicted in FIGS. 1A and 1B and as described above, the process of adsorption of water (1) by the water capture material (3) is an exothermic process accompanied with release of adsorption enthalpy. That is, the airflow through a water capture module (6) during the adsorption mode (AM) increases in temperature which correspondingly lowers the driving potential of adsorption by the water capture material (3) and decreases the difference in absolute humidity (AH) between incoming supply air (2) passing through the water capture material (3) and the discharge air (4) passing out of the water capture module (6).

As depicted in FIGS. 2A through 2C, the discharge heat exchanger (46) coupled to the adsorption airflow outlet (39) of one or more of the plurality of water capture modules (6) can substantially reduce the temperature of the discharge air (4) passing from the adsorption airflow outlet (39). In embodiments in which a plurality of water capture modules (6) are fluidically coupled in series (as shown in the example of FIG. 4 modules M5 through M) the operation of the discharge heat exchanger (46) coupled to each adsorption airflow outlet (39) can correspondingly maintain or reduce the equilibrium temperature of adsorption of the water capture material (3) in the series, and can substantially reduce RH and AH of the discharge airflow (4) as compared to embodiments of the water harvester (5) without the discharge heat exchanger (46).

Again, with primary reference to FIG. 2B and FIGS. 3 through 5, the discharge heat exchanger cold side of the discharge heat exchanger (46) can receive airflow from the environment (48) at ambient temperature. In the illustrative example of FIG. 2B, the supply air (2) temperature into water capture module (6) (M1) can be at ambient temperature of 36° C. having RH 60% and having AH 22.7 g/kg. The discharge air (4) temperature from the water capture module (6) (M1) can be 55.5° C. having RH 15.7% and AH 15.0 g/kg. The difference in temperature between the supply air (2) temperature and the discharge air (4) temperature comprises the heat associated with the adsorption enthalpy of water capture module (6) (M1). The adsorption enthalpy associated with water capture module (6) (M1) can be in part or in whole offset by passing the discharge air (4) through the hot side of the discharge heat exchanger (46). In the example of FIG. 2B, the adsorption enthalpy has been entirely offset by the discharge heat exchanger (46) by reduction in the discharge air (4) temperature to 36° C. with an associated RH 42.6% and AH 16.0 g/kg.

Where water capture modules (6) (M1, M2 . . . $M_n$) operate in series as depicted in FIGS. 4 and 5, the discharge air (4) from each water capture module (6) (M1, M2 . . . $M_n$) can comprise the supply air (2) for next water capture module (6) (M2 . . . $M_n$) in the series. Where the adsorption enthalpy is entirely offset by passing the exhaust airflow from each water capture module (6) (M1, M2 . . . $M_n$) through a corresponding discharge heat exchangers (46) (HX1, HX2, . . . $HX_n$), the discharge air (4) delivered by the last water capture module (6) in the series, in comparison to water capture modules (6) (M1, M2 . . . $M_n$) operated in series without discharge heat exchangers (HX1, HX2, . . . $HX_n$), can have substantially lower RH and AH.

Now, with primary reference to FIG. 2C and FIGS. 3 through 5, the discharge heat exchanger (46) cold side can receive an airflow from an active external cooling unit (47) (also referred to as a "chiller" in the example of FIG. 2C). The active external cooling unit (47) operates to receive an intake airflow and generate an exhaust airflow having a lower temperature. The active external cooling unit (46) can operate by any method that dissipates heat from the intake airflow. As examples, the active external cooling unit (47) can take the form of a refrigeration cooler, chiller, or an evaporative cooler. In the illustrative example of FIG. 2C, the supply air (2) temperature into water capture module (6) (M1) can be ambient air temperature of 6° C. having RH 95% and having AH 5.5 g/kg. The discharge air (4) temperature from the water capture module (6) (M1) can be 17.4° C. having RH 12.3% and AH 1.51 g/kg. The difference in temperature between the supply air (2) temperature and the discharge air (4) temperature is the heat associated with the adsorption enthalpy of water capture module (6) (M1). In the example of FIG. 2C, the adsorption enthalpy of water capture module (6) (M1) has been offset by the discharge heat exchanger (46) (HX) having a cold side operating at 5° C. with a corresponding reduction in the discharge air (4) temperature to 5° C. with an associated RH 28% and AH 1.51 g/kg. Where water capture modules (6) (M1, M2 . . . $M_n$) operate in series as depicted in FIGS. 4 and 5, the discharge air (4) from each water capture module (M1, M2 . . . $M_n$) can comprise the supply air (2) for next water capture module (6) (M2 . . . $M_n$) in the series of water capture modules (6). Where the adsorption enthalpy is entirely or largely offset by passing the discharge air (4) from each water capture module (6) (M1, M2 . . . $M_n$) through a corresponding discharge heat exchanger (46) (HX1, HX2, . . . $HX_n$) each having a cold side at 5° C., the discharge air (4) delivered by the last water capture module (6) in the series of water capture modules (6) can be at 5° C. with an associated RH 12% and AH 0.6 g/kg, and in comparison to a plurality of water capture modules (6) (M1, M2 . . . $M_n$) operated in series without discharge heat exchangers (46) (HX1, HX2, . . . $HX_n$) or in comparison to a plurality of water capture modules (6) (M1, M2 . . . $M_n$) operated in series with discharge heat exchangers (46) (HX1, HX2, . . . $HX_n$) having a cold side operated at ambient temperature, the example of FIG. 2C can deliver a final discharge air (4) having substantially lower RH and AH.

Now, with primary reference to example of FIG. 6A, certain conventional vapor-compression cooling units (49) use a latent- and sensible-capable cooling coil (50) and a sensible heating coil (51) within the same vapor-compression cooling unit (49). The cooling coil (50) dehumidifies and cools the intake air while directing condensate into a drain pan while a sensible heating coil (51) reheats the cooled intake air to raise the temperature before discharge into the indoor space (35). This conventional process requires overcooling of the intake air by the cooling coil (50) to achieve dehumidification which substantially increases the load on a latent- and sensible-capable cooling coil (50) and the sensible heating coil (51) and decreases the coefficient of performance. The energy cost attributable to latent cooling increases with an increase in the ambient heat and humidity.

Now with primary reference to FIG. 6B, certain conventional vapor-compression cooling units (49) can be retrofitted with particular embodiments of the water harvester (5) to separate latent cooling from sensible cooling. In the illustrative example of FIG. 6B, an embodiment of the water harvester (5) including one or more water capture modules (6), where each can have the adsorption airflow outlet (39) coupled to a discharge heat exchanger (46), can be disposed in front of the air intake of a vapor-compression cooling unit (49). The water harvester (5) operates to remove water (1) from the supply air (2) to the water harvester (5) and the discharge heat exchanger (46) removes the adsorption enthalpy of the water adsorption process which can be passed to the ambient environment (48). Thus, the cooling coil (50) of vapor-compression cooling unit (49) does not have to be responsible for latent cooling but only be responsible for sensible cooling. The discharge air (4) from the water harvester (5) may only need to be cooled by the cooling coil (50) to the desired temperature of indoor space (35). Therefore, the energy cost attributable to latent cooling may be entirely offset and the energy cost attributable to sensible heating may be entirely offset. Thus, the coefficient of performance can be substantially greater than conventional vapor-compression cooling units (49) that have not been retrofitted with an embodiment of the water harvester (5).

Figure 7A:
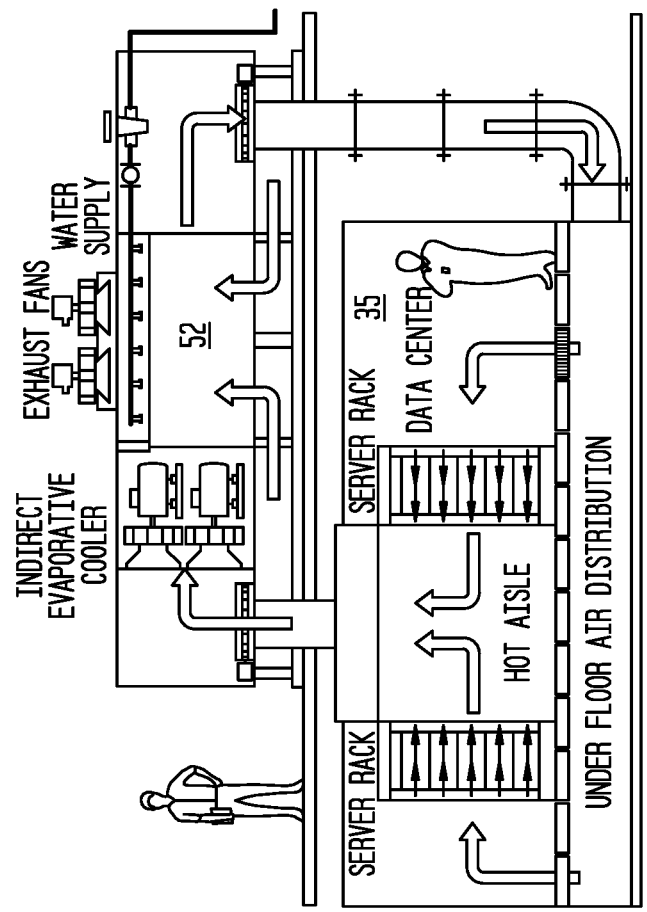
FIG. 7A is an illustration of an indoor space receiving conditioned air from an indirect evaporative cooler.

Now, with primary reference to FIG. 7A, depicting an indirect evaporative cooler (52) operating to cool intake airflow for delivery to an indoor space (35) (in the example of FIG. 7A a "data center"). Under normal operating conditions, the practical wet-bulb efficiency (WBE) of the indirect evaporative cooler (52) does not exceed 90%, where:

$$WBE(\%) = \frac{\Delta T_{conditioned}}{\Delta T_{processed}} = \frac{T_{dry-bulb,intake} - T_{dry-bulb,supply}}{T_{dry-bulb,outdoor} - T_{wet-bulb,outdoor}}$$

Thus, where the intake air dry bulb temperature is 36° C.; 60% RH, the indirect evaporative cooler can only lower the air outlet temperature by 6° C. and be limited to a temperature of not lower than 29° C.

Figure 7B:
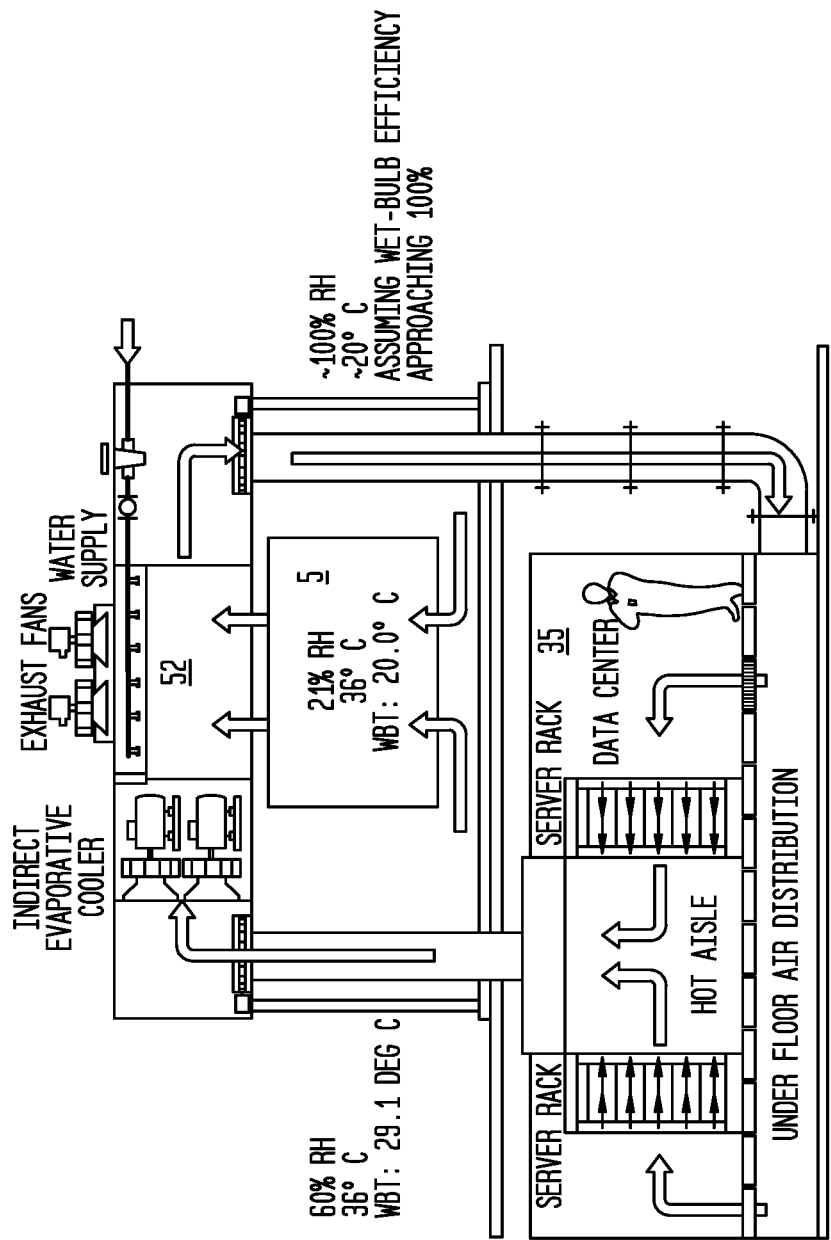
FIG. 7B is an illustration of an indoor space receiving conditioned air from an indirect evaporative cooler, wherein the intake air to the indirect evaporative cooler comprises the discharge air from an embodiment of a water harvester.

Now, with primary reference to FIG. 7B, depicting the conventional indirect evaporative cooler (52) including an embodiment of the water harvester (5), for example, in accordance with FIG. 2B. The intake airflow to the water capture module (6) (M1) can have a temperature of 36° C. at RH 60% and a wet bulb temperature of 29.1° C. and the discharge airflow (4) from water capture module (6) ($M_n$) can have a temperature of 36° C. at RH 21% and a wet bulb temperature of 20° C. The discharge air (4) from water capture module (6) $M_n$ can be delivered to the conventional indirect evaporative cooler (52) as the intake air and be exhausted from the conventional indirect evaporative cooler (52) as outlet air at 20° C. at 100% RH. The retrofit of the water harvester (5) to the conventional indirect evaporative cooler (52) expands the operating range of conventional indirect evaporative cooler by lowering the air outlet temperature from 36° C. to 20° C.

Figure 8A:
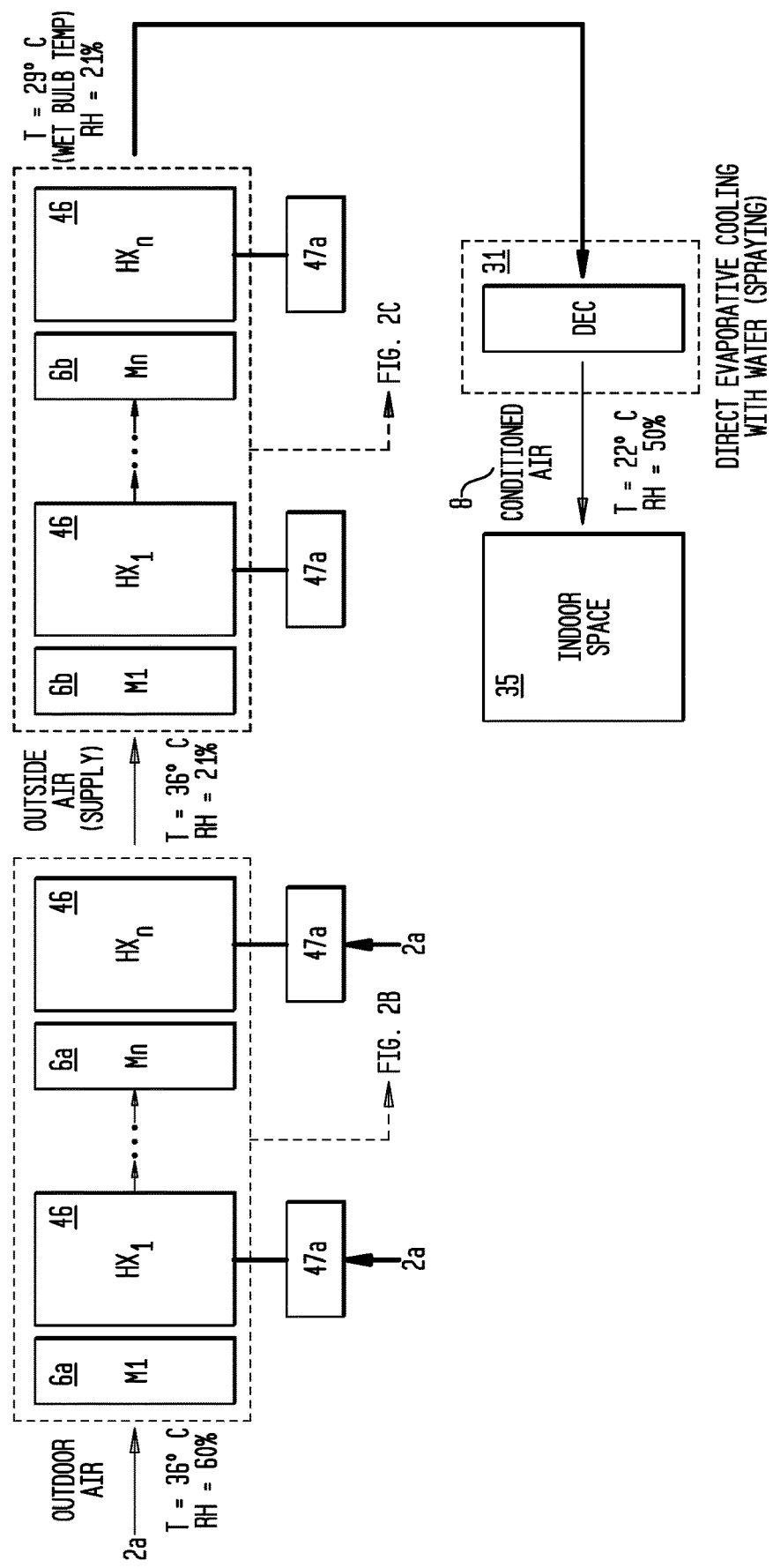
FIG. 8A is a block flow diagram of an embodiment of water harvester which combines the embodiment of the water harvester depicted in FIG. 2B and the water harvester depicted in FIG. 2C, wherein the supply air to the water harvester comprises outside air at ambient temperature and the discharge air from the water harvester is delivered to an indoor space.

Now, with primary reference to FIGS. 1 and 8A, in particular embodiments, the example depicted in FIG. 2B as described above and the example depicted in FIG. 2C as described above can be combined to comprise a first plurality of water capture modules (6a) and a second plurality of water capture modules (6b), each of the first and the second plurality of water capture modules (6a, 6b) can be fluidically coupled in series as depicted in the examples of FIGS. 4 and 5 and operable in the absorption mode (AM). The supply air (2) can be outdoor air (2a) directed to the adsorption airflow inlet (38) of the first plurality of water capture modules (6a) fluidically coupled in series. The adsorption airflow outlet (39) of each of the first plurality of water capture modules (6a) can be fluidically coupled to a discharge heat exchanger (46) ($HX_1 \ldots HX_n$) hot side. The heat exchanger (46) cold side can be fluidically coupled to a passive external cooling unit (47a) (as shown in the example of FIG. 1 (47)) using natural conduction, convection, or radiation as the cooling component. As an example, the passive external cooling unit (47a) can comprise outdoor air (2a) at ambient temperature. The adsorption airflow outlet (39) of each of the second plurality of water capture modules (6b) can be fluidically coupled to a discharge heat exchanger (46) hot side. The discharge heat exchanger (46) cold side can be fluidically coupled to an active external cooling unit (47b) (as shown in the example of FIG. 1 (47)) which requires the use of energy specifically dedicated to the cooling component. As illustrative examples, the external active cooling unit (47b) can comprise an evaporative cooling unit as described above and depicted in FIG. 7A, a refrigeration cooler, or a chiller. In particular embodiments, the discharge airflow (4) from the final water capture module (6) in the series of water capture modules (6) operated in the adsorption mode (AM) can pass through a DEC (31) (as shown in the example of FIG. 1) which can operated to further cool or raise the RH of the discharge airflow (4). The conditioned air (8) can be directed to an indoor space (35).

Figure 8B:
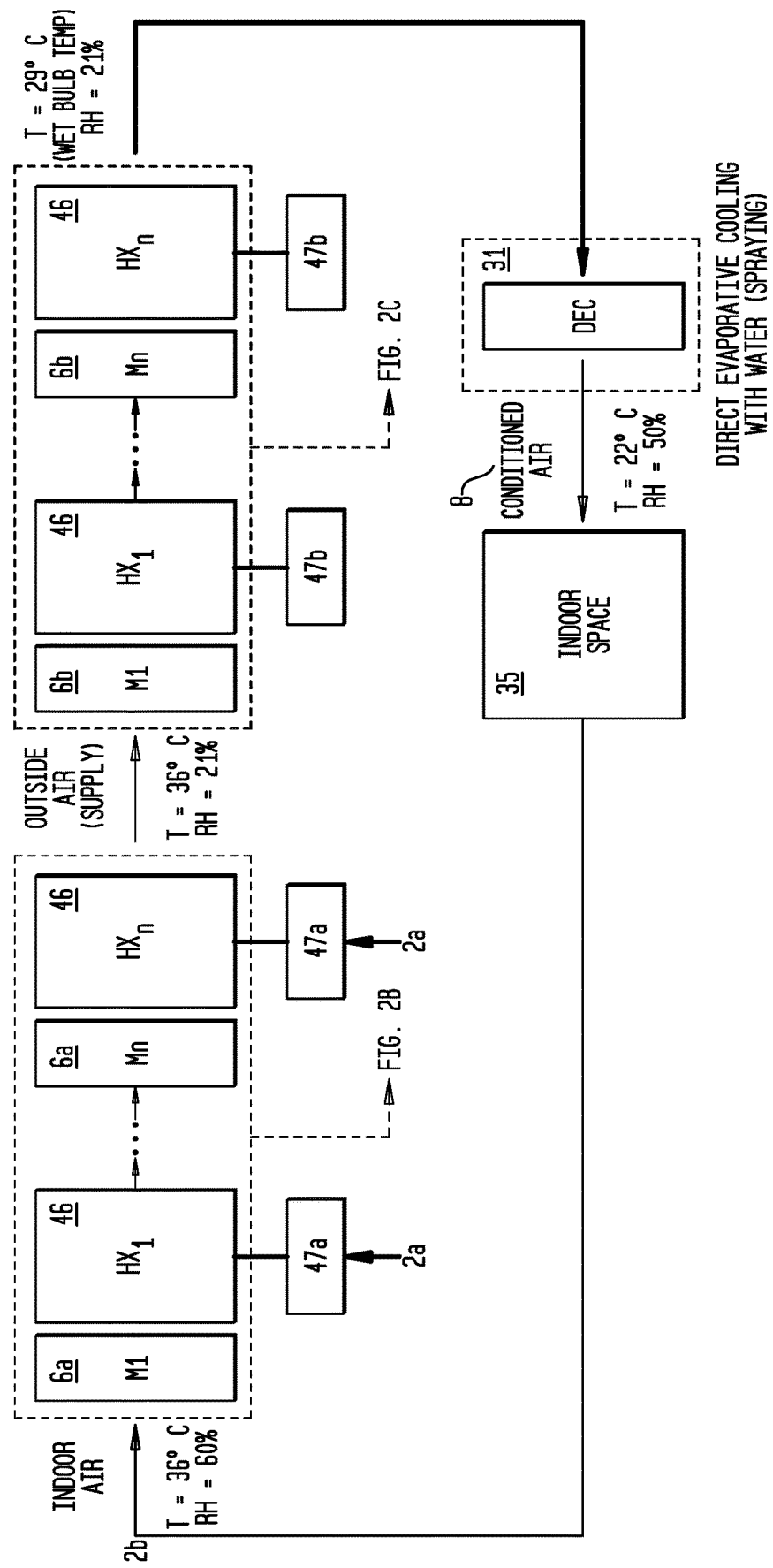
FIG. 8B is a block flow diagram of an embodiment of water harvester which combines the embodiment of the water harvester depicted in FIG. 2B and the water harvester depicted in FIG. 2C, wherein the supply air to the water harvester comprises recirculated indoor air from an indoor space and the discharge air from the water harvester is delivered to an indoor space.

Now, with primary reference to FIG. 1 and FIG. 8B, in particular embodiments, the example depicted in FIG. 2B as described above and the example depicted in FIG. 2C as described above can be combined to comprise a first plurality of water capture modules (6a) and a second plurality of water capture modules (6b), each of the first and the second plurality of water capture modules (6a, 6b) can be fluidically coupled in series as depicted in the examples of FIGS. 4 and 5 and operable in the absorption mode (AM). The supply air (2) can be indoor air (2b) from an indoor space (35) directed to the adsorption airflow inlet (38) of the first plurality of water capture modules (6a) fluidically coupled in series. The adsorption airflow outlet (39) of each of the first plurality of water capture modules (6a) and the second plurality of water capture modules (6b) can be fluidically coupled to a discharge heat exchanger (46) ($H_1 \ldots HX_n$) hot side as described above in example 8A. In particular embodiments, the discharge air (4) from the last water capture module (4) of the second plurality of water capture modules (6b) can pass through DEC (31) which can operate to further cool or raise the RH of the discharge airflow (4). The conditioned air (8) can be directed to an indoor space (35). The air from the indoor space (35) can be continuously or intermittently recirculated to the adsorption airflow inlet (38) of the first plurality of water capture modules (6a) fluidically coupled in series.

Now, with primary reference to FIG. 1 and FIG. 8C, in particular embodiments, the example depicted in FIG. 2B as described above and the example depicted in FIG. 2C as described above can be combined to comprise a first plurality of water capture modules (6a) and a second plurality of water capture modules (6b), each of the first and the second plurality of water capture modules (6a, 6b) can be fluidically coupled in series as depicted in the examples of FIGS. 4 and 5 and operable in the absorption mode (AM). The supply air (2) can be either outdoor air (2a) or indoor air (2b) from an indoor space (35) or alternate between outdoor air (2a) from an outdoor space and indoor air (2b) from an indoor space (35), or a mixture of outdoor air (2a) and indoor air (2b) directed to the adsorption airflow inlet (38) of the first plurality of water capture modules (6a). In particular embodiments additional plurality of water capture modules (6c) can be disposed in series with the first and second plurality of water capture modules (6a, 6b). The adsorption airflow outlet (39) of each of the first plurality of water capture modules (6a) and the second plurality of water capture modules (6b) can be fluidically coupled to a discharge heat exchanger (46) hot side as described above in example 8A. The additional pluralities of water capture modules (6c) can be fluidically coupled to a discharge heat exchanger (46) hot side. The discharge heat exchanger (46) cold side can be fluidically coupled to an external cooling unit (47c) which may be a passive or active cooling unit depending on the application. In particular embodiments, the discharge air (4) from the last water capture module (4) of the second plurality of water capture modules (6b) can pass through DEC (31) which can operate to further cool or raise the RH of the discharge airflow (4). The conditioned air (8) can be directed to an indoor space (35). In particular embodiments, the discharge airflow (4) from last water capture module (6) in the series of water capture modules (6a, 6b, 6c) operated in the adsorption mode (AM) can pass through DEC (31) which can operate to further cool or raise the RH of the discharge airflow (4). The conditioned air (8) can be directed to an indoor space (35).

The illustrative embodiments of FIGS. 8A through 8C, allow for the implementation of embodiments of the water harvester (5) in various combinations of water capture modules (6), heat exchangers (46) and active or passive external cooling units (47) to condition outdoor supply air and/or indoor recirculated air to precisely control the temperature and relative humidity of the discharge air (4).

Now, with primary reference to FIG. 3, in particular embodiments, the water harvester (5) can further include a controller (53) coupled to one or more ambient atmosphere temperature sensors (54) and/or one or more ambient atmosphere humidity sensors (55) located outside of the first chamber (9) and the second chamber (12) adapted to or configured to generate a signal that varies with change in ambient atmosphere temperature (AT) and/or ambient atmosphere humidity (AH) of the environment (48) surrounding one or more components of the water harvester (5). The controller (53) can be respectively coupled to one or more temperature sensors (56) and/or one or more humidity sensors (57) and/or one or more airflow sensors (58) that can be respectively located inside the first chamber (9) and/or the second chamber (12) adapted to or configured to generate a signal that varies with change in the first chamber temperature (FCT) and/or humidity (FCH), and/or second chamber temperature (SCT) and/or humidity (SCH). The controller (53) can include a controller processor (59) communicatively coupled to a non-transitory computer readable memory (60) containing a water harvesting algorithm (61) (also referred to as the "algorithm") under control of the processor (59) to analyze the signal from each sensor (54, 55, 56, 57, 58) to measure one or more of: the ambient atmosphere temperature (AT), the ambient atmosphere humidity (AH), the first chamber temperature (FCT) and/or first chamber humidity (FCH), the second chamber temperature (SCT) and/or second chamber humidity (SCH), and combinations thereof.

The first chamber temperature (FCT) and/or first chamber humidity (FCH) measurements and/or the second chamber temperature (SCT) and/or the second chamber humidity (SCH) and the ambient atmosphere temperature (AT) and/or ambient atmosphere humidity (AH) measurements can be used under the control of the controller (53) implementing the water harvesting algorithm (61) to adjust operating parameters of the water harvester (5) with respect to one or more of: reconfiguration of the reconfigurable airflow path (37) connecting the plurality of modules (in the adsorption mode (AM) between allocating the supply air (2) in parallel or in ordered series to each of the plurality of modules (6); reconfiguration of the reconfigurable airflow path (37) to dispose one or more of the plurality of modules (6) in the desorption mode (DM) with the remaining ones of the plurality of modules (6) disposed in the adsorption mode (AM); the period of time allocated to adsorption mode (AM) in which the supply air (2) flows over the water capture material (3) whether in parallel or in series; the temperature of in the first chamber (9)(FCT) during the desorption mode (DM) and the period of time allocated to the desorption mode (DM); reconfiguration of the reconfigurable flow path (37) dispose one or more of the plurality of water capture modules in the post cool mode (PCM) or the preheat mode (PHM); the temperature of the second chamber (12)(SCT) during the condensation mode (CM) and the period of time allocated to the condensation mode (CM); operation of the air circulator (18) to adjust airflow rate (AFR) to the plurality of water capture modules (6) in the adsorption mode (AM); operation of the air circulator (18) to adjust airflow rate (AFR) between the first chamber (9) and the second chamber (12), and in particular embodiments, control operation of the heat pump (23), and in particular embodiments, the water pump (32).

As can be easily understood from the foregoing, the basic concepts of the present invention may be embodied in a variety of ways. The invention involves numerous and varied embodiments of a water harvester (5) and methods for making and using such water harvester including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "harvester" should be understood to encompass disclosure of the act of "harvesting"—whether explicitly discussed or not—and, conversely, were there is a disclosure of the act of "harvesting", such a disclosure should be understood to encompass disclosure of a "harvester" and even a "means for harvesting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the water harvesters herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. An apparatus, comprising:
 a water capture module containing a water capture material,
  wherein said water capture module includes an adsorption airflow inlet and an adsorption airflow outlet,
  wherein an airflow passes through said water capture material between said adsorption airflow inlet and said adsorption airflow outlet in an adsorption mode of said water capture module,
  wherein said water capture material module includes a desorption airflow inlet and a desorption airflow outlet,
  wherein an airflow passes through said water capture material between said desorption airflow inlet and said desorption airflow outlet in a desorption mode, a preheat mode, or a precool mode of said water capture module, a heat source adapted to couple to said desorption airflow inlet and said desorption airflow outlet in said desorption mode of said water capture module, said heat source operable to heat said water capture material to desorb water vapor into said airflow passing through said water capture material between said desorption airflow inlet and said desorption airflow outlet; and an external heat exchanger having a heat exchanger hot side inlet and a heat exchanger hot side outlet and having a heat exchanger cold side inlet and heat exchanger cold side outlet, said external heat exchanger adapted to couple to said desorption airflow inlet and said desorption airflow outlet, wherein in said preheat mode of said water capture module, said desorption airflow inlet fluidically coupled to said heat exchanger hot side outlet, said desorption airflow outlet fluidically coupled to said heat exchanger cold side inlet, wherein in said post cool mode of said water capture module, said desorption airflow inlet fluidically coupled to said heat exchanger cold side outlet, said desorption airflow outlet fluidically coupled to said heat exchanger hot side inlet.

2. The apparatus of claim 1, wherein said water capture module comprises a plurality of water capture modules, wherein:

a first of said plurality of water capture modules operating in said adsorption mode, a second of said plurality of water capture modules operating in said desorption mode, a third of said plurality of water capture modules operating in said preheat mode, wherein said third of said plurality of water capture modules having said desorption airflow inlet fluidically coupled to said external heat exchanger hot side outlet and said desorption airflow outlet fluidically coupled to said external heat exchanger cold side inlet, a fourth of said plurality of water capture modules operating in said precool mode, wherein said fourth of said plurality of water capture modules having said desorption airflow inlet fluidically coupled to external heat exchanger hot side outlet and said desorption airflow outlet coupled to external heat exchanger hot side inlet.

3. The apparatus of claim 2, further comprising a plurality of discharge heat exchangers, wherein said adsorption airflow outlet of each of said plurality of water capture modules fluidically coupled to a discharge heat exchanger hot side inlet of one of said plurality of discharge heat exchangers, wherein said adsorption airflow inlet of at least one said plurality of water capture modules in said adsorption mode fluidically coupled to a discharge heat exchanger hot side outlet.

4. The apparatus of claim 3, further comprising a cooling unit fluidically coupled to said discharge heat exchanger cold side inlet.

5. The apparatus of claim 1, further comprising a first chamber fluidically coupled to a desorption airflow inlet and a desorption airflow outlet of said water capture module, said heat source thermally coupled to said first chamber, wherein heated airflow recirculates between said first chamber and said water capture module to desorb said water vapor from said water capture material.

6. The apparatus of claim 5, further comprising a cool source thermally coupled to said water vapor desorbed from said water capture material to condense liquid water from said water vapor.

7. The apparatus of claim 6, further comprising a second chamber fluidically coupled to said first chamber, said cooling source thermally coupled to said second chamber, wherein said water vapor recirculates between said first chamber and said second water chamber.

8. The apparatus of claim 7, further comprising a water reservoir fluidically coupled to said second chamber to collect said liquid water.

9. A water harvester, comprising:

a first water capture module having first water capture module airflow inlet and a first water capture module airflow outlet;

a second water capture module having second water capture module airflow inlet and a second water capture module airflow outlet; and an external heat exchanger having a heat exchanger hot side inlet and a heat exchanger hot side outlet and having a heat exchanger cold side inlet and heat exchanger cold side outlet, said first water capture module airflow inlet fluidically coupled to said external heat exchanger cold side outlet, said first water capture module airflow outlet fluidically coupled to said external heat exchanger hot side inlet, said second water capture module inlet fluidically coupled to external heat exchanger hot side outlet, said second water capture module outlet fluidically coupled to external heat exchanger cold side inlet.

\* \* \* \* \*